US012783536B2

(12) United States Patent
Huang

(10) Patent No.: US 12,783,536 B2
(45) Date of Patent: Nov. 3, 2026

(54) DATA PROCESSING METHOD AND APPARATUS

(71) Applicant: Beijing Volcano Engine Technology Co., Ltd., Beijing (CN)

(72) Inventor: Kaixin Huang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/857,174

(22) PCT Filed: Aug. 28, 2023

(86) PCT No.: PCT/CN2023/115226
§ 371 (c)(1),
(2) Date: Oct. 15, 2024

(87) PCT Pub. No.: WO2024/060934
PCT Pub. Date: Mar. 28, 2024

(65) Prior Publication Data

US 2025/0258834 A1 Aug. 14, 2025

(30) Foreign Application Priority Data

Sep. 22, 2022 (CN) ......................... 202211160563.8

(51) Int. Cl.
*G06F 16/25* (2019.01)

(52) U.S. Cl.
CPC .................................... *G06F 16/25* (2019.01)

(58) Field of Classification Search
None
See application file for complete search history.

(56) References Cited

U.S. PATENT DOCUMENTS

2015/0347243 A1 12/2015 Guerin et al.
2020/0014688 A1* 1/2020 Kohli .................... H04L 9/0891
(Continued)

FOREIGN PATENT DOCUMENTS

CN 108268208 A 7/2018
CN 109491602 A 3/2019
(Continued)

OTHER PUBLICATIONS

International Patent Application No. PCT/CN2023/115226; Int'l Written Opinion and Search Report; dated Oct. 23, 2023; 7 pages.
(Continued)

*Primary Examiner* — Richard L Bowen
(74) *Attorney, Agent, or Firm* — BakerHostetler

(57) ABSTRACT

The present disclosure relates to a data processing method and apparatus. The method includes: receiving, by a network card module in a smart network card, a data operation request sent by a client; calling a request analysis module to parse the data operation request to obtain data to be processed and data operation type information, and inputting the data to be processed and the data operation type information into an execution engine module; calling the execution engine module to perform, on the basis of the data to be processed, a data operation indicated by the data operation type information to obtain a data operation result; and calling the request analysis module to encapsulate the data operation result to obtain a response to the data operation request, and sending, to the client and by the network card module, the response to the data operation request.

20 Claims, 10 Drawing Sheets

(56) References Cited

U.S. PATENT DOCUMENTS

| | | | | |
|---|---|---|---|---|
| 2020/0228446 | A1 * | 7/2020 | Geng | H04L 45/243 |
| 2020/0272579 | A1 | 8/2020 | Humphrey et al. | |
| 2020/0356419 | A1 | 11/2020 | Jacob et al. | |
| 2023/0344921 | A1 * | 10/2023 | Duraisamy | H04L 63/0272 |
| 2024/0330211 | A1 | 10/2024 | Li et al. | |
| 2025/0184224 | A1 * | 6/2025 | Piao | H04L 41/0896 |

FOREIGN PATENT DOCUMENTS

| | | | | | |
|---|---|---|---|---|---|
| CN | 109857379 | A | | 6/2019 | |
| CN | 112596669 | A | | 4/2021 | |
| CN | 113296718 | A | | 8/2021 | |
| CN | 114281765 | A | | 4/2022 | |
| CN | 114285676 | A | * | 4/2022 | |
| CN | 114385636 | A | | 4/2022 | |
| CN | 114553978 | A | | 5/2022 | |
| CN | 114817232 | A | | 7/2022 | |
| EP | 4293530 | A1 | * | 12/2023 | G06F 16/2255 |
| KR | 2019-0089420 | A | | 7/2019 | |
| WO | WO 2022/057439 | A1 | | 3/2022 | |
| WO | WO 2022/156650 | A1 | | 7/2022 | |
| WO | WO 2022/206170 | A1 | | 10/2022 | |
| WO | WO-2022218160 | A1 | * | 10/2022 | G06F 13/28 |

OTHER PUBLICATIONS

China Patent Application No. 202211160563.8; Office Action; dated Nov. 1, 2025; 18 pages.

China Patent Application No. 202211160563.8; Notice of Registration; dated Feb. 4, 2026; 8 pages.

* cited by examiner

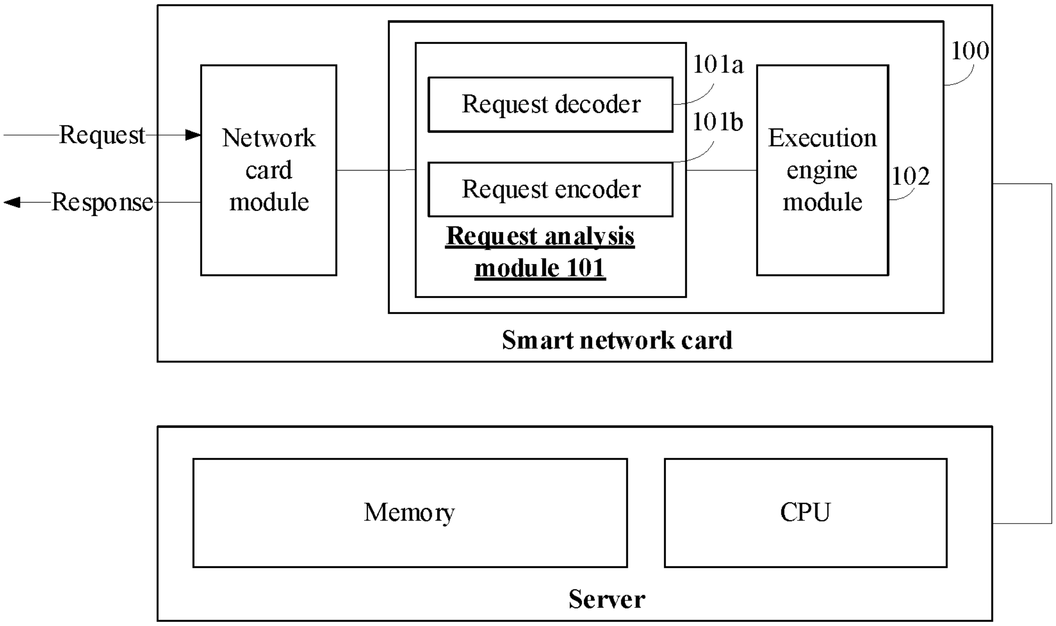

FIG. 1

<table>
<tr><td colspan="2">Transaction identifier</td><td>A total quantity of requests/responses in the current transaction</td><td colspan="2">An order of the current request/response in all requests/responses</td></tr>
<tr><td>Data operation type</td><td>A length of a key in the current transaction</td><td>A length of a key in the current transaction</td><td>A length of a key comprised in the request</td><td>A length of a value comprised in the request</td></tr>
<tr><td colspan="5">Key</td></tr>
<tr><td colspan="5">Value</td></tr>
<tr><td colspan="5">Check information</td></tr>
</table>

FIG. 2

| | Data type | Storage manner of related information of key and value | Related information of key | Related information of value |
|---|---|---|---|---|
| Index slot 1 | Int32 | 01 | Key | Value |
| Index slot 2 | String | 01 | Key | Value |
| Index slot 3 | Int64 | 10 | Key | Pointer information |
| Index slot 4 | String | 11 | Fingerprint digest information of the key | Pointer information |

FIG. 6

DATA PROCESSING METHOD AND APPARATUS

CROSS-REFERENCE TO RELATED APPLICATION(S)

The present application is a U.S. National Stage Application under 35 U.S.C. § 371 of International Patent Application No. PCT/CN2023/115226, filed on Aug. 28, 2023, which claims priority to Chinese Application No. 202211160563.8, filed on Sep. 22, 2022, both of which are incorporated herein by reference in their entireties.

TECHNICAL FIELD

The present disclosure relates to a data processing method and apparatus.

BACKGROUND

A key-value store (KV-store, referred to as KVS for short) is a new type of non-relational database (NoSQL database), and mainly stores data in a form of key-value pairs. In terms of data storage, the KV-store is more flexible than a relational database in the related art. In terms of an access interface, the KV-store uses simple data access interfaces such as write (PUT) and read (GET) to meet a large number of service requirements. Therefore, the KV-store is widely used in various fields.

SUMMARY

In a first aspect, the present disclosure provides a data processing method, comprising: receiving, by using a network card module in a smart network card, a data operation request sent from a client; calling a request analysis module in the smart network card to parse the data operation request to obtain data to be processed and data operation type information, and inputting the data to be processed and the data operation type information into an execution engine module in the smart network card; calling the execution engine module to perform, based on the data to be processed, a data operation indicated by the data operation type information to obtain a data operation result; and calling the request analysis module to encapsulate the data operation result to obtain a response to the data operation request, and sending, by using the network card module, the response to the data operation request to the client.

In a second aspect, the present disclosure provides a data processing apparatus, comprising: a network card module configured to receive a data operation request sent from a client; a request analysis module configured to parse the received data operation request to obtain data to be processed and data operation type information, and input the data to be processed and the data operation type information into an execution engine module; and the execution engine module configured to perform, based on the data to be processed, a data operation indicated by the data operation type information to obtain a data operation result; where the request analysis module is further configured to encapsulate the data operation result to obtain a response to the data operation request; and the network card module is further configured to send the response to the data operation request to the client.

In a third aspect, the present disclosure provides an electronic device, comprising: a memory and a processor, where the memory is configured to store computer program instructions, and the processor is configured to execute the computer program instructions, to cause the electronic device to implement the data processing method according to the first aspect.

In a fourth aspect, the present disclosure provides a readable storage medium, comprising: computer program instructions which, when executed by at least one processor of an electronic device, cause the electronic device to implement the data processing method according to the first aspect.

In a fifth aspect, the present disclosure provides a computer program product that, when executed by an electronic device, causes the electronic device to implement the data processing method according to the first aspect.

In a sixth aspect, the present disclosure provides a computer program, comprising: instructions that, when executed by a processor, cause the processor to perform the data processing method according to the first aspect.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

To describe the technical solutions in the embodiments of the present disclosure or in the prior art more clearly, the following briefly introduces the accompanying drawings required for describing the embodiments or the prior art. Apparently, a person of ordinary skill in the art can still derive other accompanying drawings from these accompanying drawings without creative efforts.

FIG. 1 is a schematic diagram of a framework of a data processing system according to an embodiment of the present disclosure;

FIG. 2 is a data structure diagram of a data operation request/response according to an embodiment of the present disclosure;

FIG. 6 is a schematic diagram of a data structure of an index slot in an index structure illustratively shown in the present disclosure;

DETAILED DESCRIPTION OF EMBODIMENTS

Figure 3:
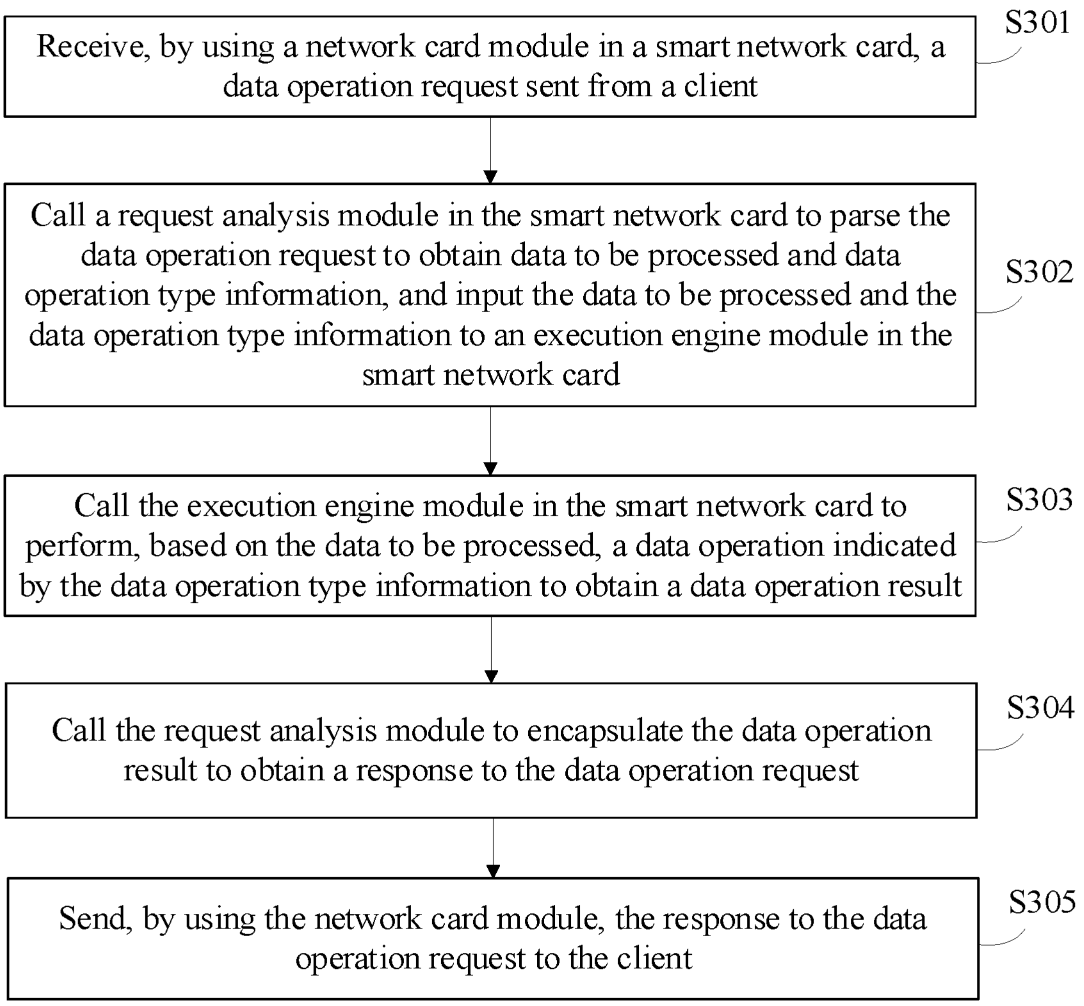
FIG. 3 is a schematic flowchart of a data processing method according to an embodiment of the present disclosure.

In order to more clearly understand the above objectives, features, and advantages of the present disclosure, the solutions of the present disclosure are described below in further detail. It should be noted that in the case of no conflict, the embodiments of the present disclosure and the features in the embodiments may be combined with each other.

A lot of specific details are set forth in the following description to fully understand the present disclosure, but the present disclosure may also be implemented in other manners different from those described herein; apparently, the embodiments in the description are merely some embodiments of the present disclosure, rather than all of the embodiments.

With unique advantages, the KVS is widely used in many fields. Currently, to support higher-performance data storage and access, deploying a service and an application in a memory key-value database becomes a new solution.

With rapid development of distributed system design, a distributed memory key-value database becomes a new research hotspot. The distributed memory key-value database transmits data over a network and allows data to be stored on a plurality of nodes, which not only provides a larger storage space for key-value data pairs, but also has more flexible scalability (that is, a storage service node is dynamically added or deleted).

A remote direct memory access (RDMA) technology has the characteristics of high bandwidth and low latency, which coincides with the goal of the KVS of pursuing high throughput and low latency. In addition, the RDMA technology supports not only bilateral message semantics similar to a socket network transmission mechanism in the related art, but also unilateral memory semantics.

A main interaction process of data processing using the bilateral message semantics is as follows: A client node sends an operation request to a server node, the server node executes a corresponding data operation such as PUT/GET locally, and returns an operation result to the client node. After receiving the result fed back by the server node, the client node completes the operation.

The unilateral memory semantics means that a client can directly access a memory space of a server in a server-bypass manner. The unilateral memory semantics provides a more convenient way for constructing a shared memory and an application programming interface (API) similar to load/store for a distributed system. A main interaction process of data processing using the unilateral memory semantics is as follows: For a GET operation, an RDMA READ operation is used to complete reading of key-value pair data; and for a PUT operation, RDMA ATOMIC, RDMA WRITE, and RDMA READ operations need to be properly combined to support consistent data writing. In a unilateral memory semantics scenario, the server node basically does not need to respond on a subsequent critical data path, except for participating in data storage and initial communication establishment. A memory KVS based on the bilateral message semantics and the unilateral memory semantics respectively has advantages. The bilateral message semantics can support more flexible and diverse interface definitions (because a data operation process can be hidden from a user side), and the unilateral memory semantics can implement faster and more efficient data access in a single network round-trip time (RTT).

However, the inventor of the present disclosure finds that the memory key-value database based on RDMA in the related art has at least the following problems:

1. A CPU Processing Bottleneck Problem of a Server Node.

The memory key-value database using an RPC mechanism based on the bilateral message semantics needs to send an operation request to the server node, and a CPU of the server node is responsible for executing specific data storage logic and returning a data operation result to the client. This processing mechanism may cause the CPU of the server node to become a performance bottleneck on a critical path in a high-concurrency scenario (for example, hundreds or even thousands of clients access simultaneously), and may further cause high tail latency. This is not only because of a multi-core frequency limit of a single server, but also related to an interaction mode between the CPU and a network card. The CPU of the server node not only needs to prepare a receive work request (recv work request, RECV WR) for a data operation request of each client node in advance and be responsible for polling a completion queue (CQ), but also needs to process the operation request, copy data, prepare a send work request (send work request, SEND WR), and the like, which incurs a lot of additional access overheads. In addition, because the CPU of the server node is a core device that executes KVS access, it is necessary to deploy a more expensive and efficient CPU component, an adapted motherboard, and the like on the server. This is contrary to the idea of a compute-storage separation architecture (namely, a computing resource is decoupled from a storage resource, and a storage node only needs to focus on data storage) advocated in the current cloud computing field, and it is difficult to control a low total cost of ownership (TCO) of the storage node.

2. A Complex KVS Access Protocol Implementation and a Plurality of Network Round-Trip Overheads.

The memory key-value database using the unilateral memory semantics allows the client to perform index query and locate a memory address of a server node where corresponding key-value pair data is located, and complete GET/PUT operations through operations such as READ and WRITE. However, this not only requires the client node to cache an index structure of the key-value pair data of the server node, but also poses higher challenges for consistency of concurrent operations: A centralized consistency guarantee mechanism of the server node in the related art needs to be upgraded to distributed consistency guarantee, which is more complex and more difficult to ensure correctness. Moreover, even if consistent data writing operations are supported by combining a plurality of WRITE, ATOMIC, and READ operations, there are still a plurality of network round-trip overheads. Due to the lack of transaction support, a memory-level abstraction provided by RDMA is not suitable for constructing an efficient KVS.

3. Low Utilization Efficiency of Hardware Bandwidth, and a Throughput Performance Bottleneck.

Hardware bandwidths such as a network card wire speed, a peripheral component interconnect express (PCIe) bandwidth, and a memory bandwidth determine an upper limit of memory key-value database access. As mentioned in the foregoing parts, both the memory key-value database system based on the bilateral message semantics and the memory key-value database system based on the unilateral memory semantics have a performance bottleneck (for example, a CPU processing bottleneck or a plurality of network round-trip times). This makes it impossible for them to efficiently use hardware bandwidth resources. For example, when the CPU becomes a processing bottleneck, there is a waste of memory bandwidth and network bandwidth; and when network round-trip times become a bottleneck, there is a waste of PCIe bandwidth and network bandwidth. Naturally, the waste of bandwidth results in a throughput bottleneck, and cannot support construction of an efficient memory key-value database in an ideal state.

With continuous development of Internet technologies, network cards (that is, network interface controllers (NICs)) (such as RDMA over converged ethernet (RoCE) and an InfiniBand host channel adapter (HCA)) that support the RDMA technology are gradually popularized in network deployment. In addition, another evolution trend of hardware acceleration is emerging in data centers. An increasing number of data center servers are equipped with smart network cards (SmartNICs, which may also be referred to as programmable network cards). A core component of the SmartNIC is a field programmable gate array (FPGA) with an embedded NIC chip for connecting to a network and a PCIe connector for connecting to a server (host).

The inventor of the present disclosure finds that with the rapid development of the Internet, an explosive growth is presented in network use, and access pressure on a database is continuously increasing. In a high-concurrency access scenario for the database, for example, when hundreds or thousands of users access simultaneously, performance of the database may deteriorate.

In view of this, embodiments of the present disclosure provide a data processing method, to improve performance of a key-value database.

In the data processing method provided in the present disclosure, some workloads of a CPU of a server are migrated to a smart network card, and an FPGA in the smart network card is used as a processor chip to process a data operation request sent from a client. The smart network card presents an access abstraction of a KVS for a client node, without requiring the CPU of the server to participate in the processing process of the data operation request, thereby effectively reducing processing pressure on the CPU of the server. In addition, both PUT and GET operations support an operation latency of one network round-trip time, maximizing use of network bandwidth to improve access throughput. It should be noted that the data processing method provided in the present disclosure is also applicable to a database with similar problems.

Next, the data processing method provided in the present disclosure is described in detail in some embodiments, with reference to the accompanying drawings and scenarios. The data processing method may be performed by the data processing apparatus provided in the present disclosure, and the apparatus may be implemented by any software and/or hardware manner, for example, may be a software system. In the following embodiments, the data processing apparatus is a data processing system, and a database deployed on a server is a memory key-value database.

FIG. 1 is a schematic diagram of a framework of a data processing system according to an embodiment of the present disclosure. As shown in FIG. 1, a data processing system 100 is deployed on a smart network card, and the data processing system 100 can access and operate a database in a memory of a server. A network card module in the smart network card is mainly configured to receive a data operation request sent from a client and send the data operation request to a corresponding module of the data processing system 100, and deliver a response generated by the data processing system 100 to the client.

For example, the data processing system 100 comprises a request analysis module 101 and an execution engine module 102. The request analysis module 101 is mainly configured to parse, identify, and encapsulate and forward a data operation request transmitted by a network card module in the smart network card. For example, the request analysis module 101 comprises a request decoder 101*a* and a request encoder 101*b*. The request decoder 101*a* is mainly configured to obtain and parse and identify a data operation request sent by a client from the network card module; and the request encoder 101*b* is mainly configured to perform data encapsulation based on a data operation result transmitted by the execution engine module 102 to obtain a response to the data operation request, and forward the response to the network card module, so that the network card module feeds back the response to the client.

The execution engine module 102 is mainly configured to perform a corresponding operation (such as a data operation such as write/read/delete) based on a data operation type indicated by a data operation request sent from a client, and transmit a data operation result to the request analysis module 101. The execution engine module 102 may interact with a memory of the server to implement an operation on key-value pair data.

As a possible implementation, the request decoder 101*a* and the request encoder 101*b* in the request analysis module 101 may share the same data structure, that is, the data operation request and the data operation result may share the same data structure. As shown in FIG. 2, FIG. 2 illustratively shows a schematic diagram of a data structure shared by a data operation request/response.

For example, the data operation request/response comprises one or more of transaction identification information, information about a quantity of total requests/responses that constitute a current transaction, sequence information of a current request in all requests/responses, a data operation type, a total length of a key corresponding to the current transaction, a total length of a value of the current transaction, a length of a key comprised in the current request/response, a length of a value comprised in the current request/response, a field for accommodating all or some key data of the current transaction, a field for accommodating all or some value data of the current transaction, check information, and the like.

In the embodiments of the present disclosure, a data size of the data operation request/response is not limited, for example, may be 32 bytes, 64 bytes, 128 bytes, or the like. Illustratively, in the embodiment shown in FIG. 2, an example in which the data operation request/response may be 64 bytes is used for description. Specifically, the data operation request/response may comprise a 4-byte T×ID field (referring to a globally unique transaction ID that may be specified by a user), a 2-byte Num field (indicating a quantity of total requests/responses that constitute the current transaction, so as to handle variable-length keys and values), a 2-byte Seq field (indicating a sequence of the current request/response in all requests/responses of the current transaction, and used for data splicing after all requests or responses are received), a 2-byte Opcode field (indicating a data operation type, such as read/write/delete), a 2-byte Tkey_len field (indicating a total length of a key of the current transaction, which may span a plurality of requests), a 2-byte Tvalue_len field (indicating a total length of a value of the current transaction, which may span a plurality of requests/responses), a 1-byte Key_len field (a length of a key comprised in the current request), a 1-byte Value_len field (a length of a value comprised in the current request/response), a 16-byte Key field (accommodating all or some key data of the current transaction), a 24-byte Value field (accommodating all or some value data of the current transaction), and an 8-byte Checksum field (namely, the check information, which may be a checksum of a single request, and used for checking integrity and accuracy of request/response data after network transmission).

FIG. 3 is a schematic flowchart of a data processing method according to an embodiment of the present disclosure. As shown in FIG. 3, the method provided in this embodiment comprises the following steps.

S301: Receive, by using a network card module in a smart network card, a data operation request sent from a client.

In some embodiments, step S301 comprises: receiving, by using the network card module, a plurality of data operation requests sent from the client and having a same transaction identifier.

S302: Call a request analysis module in the smart network card to parse the data operation request to obtain data to be processed and data operation type information, and input the data to be processed and the data operation type information into an execution engine module in the smart network card.

As shown in FIG. 1, the network card module of the smart network card may receive a data operation request sent from a client, and transmit the data operation request to a request decoder, and the request decoder parses the data operation request to obtain information such as a data operation type and key-value pair data in a data structure corresponding to the data operation request.

In some embodiments, a client may send a separate data operation request to the data processing system. Correspondingly, a request decoder of the data processing system may parse the separate data operation request to obtain information therein and perform a corresponding operation.

In some other embodiments, the client may send a plurality of data operation requests to the data processing system, so that the data processing system aggregates the plurality of data operation requests, to perform a corresponding operation on ultra-long key-value pair data. Illustratively, referring to the data structure shown in FIG. 2, a request decoder of the data processing system may parse and identify the plurality of data operation requests, obtain a T×ID field, a Seq field, a Checksum field, and the like in each data operation request, and then identify whether the data operation requests belong to a same transaction based on the T×ID in the plurality of data operation requests, restore an order of the data operation requests through the Seq field, and use the Checksum field to check data consistency, to implement the data operation on the ultra-long key-value pair data. The request decoder may separately parse the plurality of data operation requests having the same transaction identifier to obtain a plurality of Key fields, and then splice the plurality of Key fields in an order indicated by the Seq field to obtain the data to be processed corresponding to the transaction. The data operation types indicated in the data operation requests having the same transaction identifier are consistent. It should be noted that if a Value field is required to execute the data operation request, the Value fields obtained through parsing may also be spliced in the foregoing manner.

In some embodiments, the calling the request analysis module in the smart network card to parse the data operation request to obtain the data to be processed and data operation type information comprises: calling the request analysis module to respectively parse a plurality of data operation requests having a same transaction identifier to obtain a plurality of data fields and a plurality of identical data operation type information items; and calling the request analysis module to splice the plurality of data fields to be processed based on sequence indication information respectively comprised in the plurality of data operation requests to obtain the data to be processed.

In some embodiments, the plurality of data operation requests having the same transaction identifier have a same data structure.

S303: Call the execution engine module in the smart network card to perform, based on the data to be processed, a data operation indicated by the data operation type information to obtain a data operation result.

The data operation request may be a data read request, a data write request, or a data delete request. The execution engine module of the data processing system may perform a read operation, a write operation, or a delete operation based on a data operation type indicated by the data operation request, to obtain a corresponding data operation result.

If the data operation request is the data read request, the data operation result obtained by the execution engine module may be target data (such as value data) indicated by the read data to be processed; if the data operation request is a data write operation, the data operation result obtained by the execution engine module may be information about whether writing succeeds or fails; and if the data operation request is a data delete request, the data operation result obtained by the execution engine module may be information about whether deletion succeeds or fails.

In some embodiments, the calling the execution engine module to perform, based on the data to be processed, the data operation indicated by the data operation type information to obtain the data operation result comprises: calling the execution engine module to determine, based on the data to be processed, a target index slot corresponding to the data to be processed from an index structure stored in a memory comprised in the smart network card; and calling the execution engine module to perform, on the target index slot, the data operation indicated by the data operation type information to obtain the data operation result.

S304: Call the request analysis module to encapsulate the data operation result to obtain a response to the data operation request.

In some embodiments, S304 comprises: calling the request analysis module to update a target field in a data structure corresponding to the data operation request based on the data operation result to obtain the response to the data operation request.

The request encoder may fill the data operation result into a specified field in the data structure corresponding to the data operation request to obtain a response.

Take the data structure in the embodiment shown in FIG. 2 as an example:

Exemplarily, if the data operation request is the data read request, the request encoder may fill read value data (namely, the data operation result) into a Value field in the data structure corresponding to the data operation request to obtain the response to the data operation request.

As a possible implementation, if the data read request is an operation on ultra-long key-value pair data, a data size of read value data may be relatively large. If a size of a corresponding field in the data operation request cannot meet the data size of the read value data, a plurality of response structures may be created based on the data size of the read value data, to accommodate the read value data.

For example, referring to the data structure shown in FIG. 2, the value field is 24 bytes. If the read value data is less than 24 bytes, the read value data may be written into the value field. If the read value data is greater than 24 bytes, the plurality of required response structures may be created, and then the read value data is written into value fields respectively corresponding to the plurality of response structures.

If the data operation request is the data write request or the data delete request, the request encoder may change a field (the Opcode field) in the data structure shown in FIG. 2 that is used to indicate the data operation type to ack/null, to represent that the write/delete operation succeeds/fails. ack may represent that the write/delete operation succeeds, and null may represent that the write/delete operation fails.

It should be noted that the implementation of reusing the data structure shown here is merely an example. The data structure of the request/response and the reuse manner may also be implemented in another manner, which is not limited in the present disclosure.

S305: Send, by using the network card module, the response to the data operation request to the client.

The request encoder delivers the encapsulated response to the network card module of the smart network card, and the network card module transmits the response to the client. After receiving the response, the client parses the response, and may first match a T×ID field, and then check an Opcode field to confirm a data operation type, and if necessary, obtain data from a Value field. For example, when the data operation request is the data read request, the client may obtain data in the Value field. If the data operation request is the data write request/data delete request, the client may obtain the Opcode field to determine whether data writing/deletion succeeds.

To sum up, the data processing method according to some embodiments of the present disclosure is provided. The data processing method comprises: receiving, by using a network card module in a smart network card, a data operation request sent from a client; calling a request analysis module in the smart network card to parse the data operation request to obtain data to be processed and data operation type information, and inputting the data to be processed and the data operation type information into an execution engine module in the smart network card; calling the execution engine module to perform, based on the data to be processed, a data operation indicated by the data operation type information to obtain a data operation result; and calling the request analysis module to encapsulate the data operation result to obtain a response to the data operation request, and sending, by using the network card module, the response to the data operation request to the client. In the method provided in this embodiment, some workloads of a CPU of a server are migrated to the smart network card, and the smart network card processes the data operation request sent from the client. In addition, the smart network card presents an access abstraction of a database for a client node, without requiring the server CPU to participate in the processing of the data operation request, thereby reducing processing pressure on the CPU of the server.

In addition, the response reuses a data structure of the data operation request. Through the data structure reuse mechanism, space allocation and data copying overheads of the server can be reduced.

In addition, a data structure that supports aggregated multi-data operation requests is cache-aligned. Therefore, network transmission overheads caused by boundary misalignment can be reduced during data transmission, and read-write amplification is avoided as much as possible.

From a storage perspective, a key-value database may comprise two parts: an index structure and key-value pair data, where the key-value pair data is a target object of a user for performing data operations, and the index structure is retrieval data structure for looking up a storage location of the requested key-value pair data.

Figure 4:
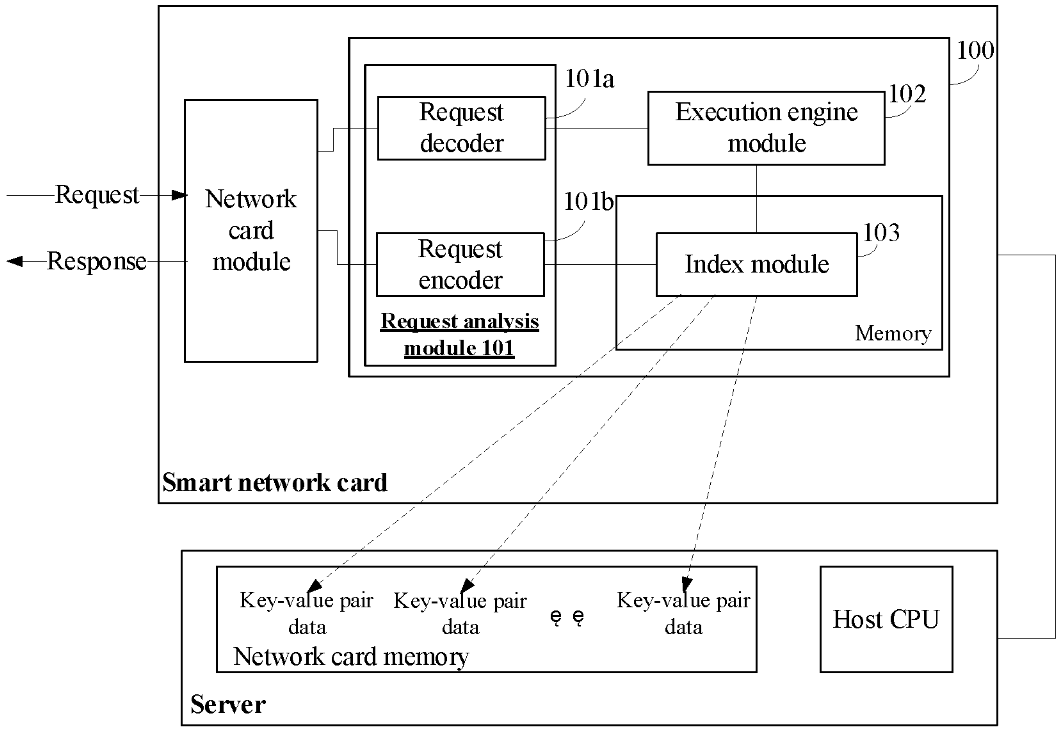
FIG. 4 is a schematic diagram of a framework of a data processing system according to another embodiment of the present disclosure.

FIG. 4 is a schematic diagram of a framework of a data processing system according to an embodiment of the present disclosure. As shown in FIG. 4, in addition to the modules shown in FIG. 1, the data processing system provided in this embodiment further comprises an index module 103. The index module 103 may be disposed in a memory of the smart network card, and comprises index information corresponding to key-value pair data. Key-value pair data pointed to by the index information may be stored in a memory of a server (namely, a host memory, referred to as the memory of the server below).

In response to the index module 103 being disposed in the memory of the smart network card to store the index structure, when the execution engine module 102 is called to process the data operation request sent from the client, the execution engine module 102 may further need to interact with the index module 103.

The present disclosure is not limited to a specific implementation of the index structure. As a possible implementation, the index structure may be a hash index structure, for example, a chained hash index structure, a cuckoo hash index structure, a hopscotch hash index structure, or the like. Certainly, the index structure may also be a binary tree, a radix tree, a B tree, a B+ tree, a red-black tree, or another structure.

In this embodiment, to improve memory utilization of the smart network card, the index structure may be implemented in a manner of sub-index structure organization and a multi-way index mechanism. The sub-index structure organization means that the index structure comprises a plurality of sub-index structures, each sub-index structure may comprise a plurality of index slots, and each index slot may be used to store related information about key-value pair data. The multi-way index mechanism means that the data operation request is mapped to the plurality of sub-index structures by using a plurality of preset mapping manners. Through the sub-index structure organization and the multi-way index mechanism, load balancing processing for accessing the index structure can be implemented, thereby avoiding a large access pressure caused by a large quantity of accesses to a same index structure.

Figure 5:
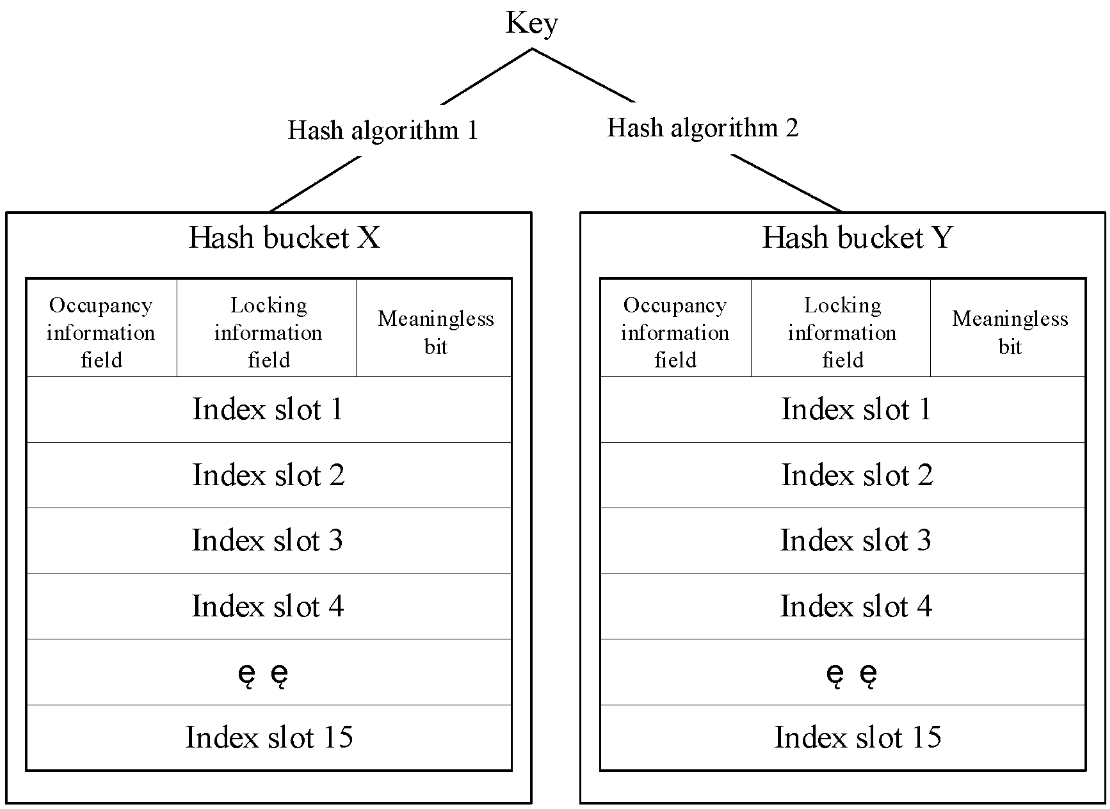
FIG. 5 is a schematic diagram of a framework of a hash index mechanism illustratively shown in the present disclosure.

When the index structure is implemented by using the hash index structure, the index structure may comprise a plurality of hash buckets, and mapping is performed in a multi-way hash manner when the data operation request is processed. FIG. 5 illustratively shows a schematic diagram of a hash index mechanism by using the hash buckets and the two-way hash as an example.

As shown in FIG. 5, the two hash buckets are respectively a hash bucket X and a hash bucket Y, where the hash bucket X and the hash bucket Y may be cache-aligned, so that access overheads of accessing the same hash bucket can be greatly reduced by using spatial locality of a cache. Each hash bucket may comprise a plurality of index slots, a field for indicating whether each index slot in the bucket is an idle slot, and a field for indicating whether the index slot in the bucket is occupied by a thread.

Assume that one hash bucket is 64 bytes and is cache-aligned, each hash bucket may comprise 4 bytes of metadata: a 1-byte Bitmap field (each bit represents whether a corresponding index slot in the bucket is an idle slot, where 0 represents an idle slot and 1 represents an occupied slot), a 1-byte Lockmap field (each bit represents whether the corresponding index slot in the bucket is occupied by a thread, where 0 represents an idle slot and 1 represents an occupied slot), and a 2-byte Padding field (the field is meaningless bits, and is used only for aligning to 4 bytes). Each hash bucket may comprise four 15-byte index slots, and each index slot may be used to store index information of one piece of key-value pair data.

It should be noted that the present disclosure is not limited to a quantity of index slots comprised in each hash bucket. The quantities of index slots respectively comprised in the hash buckets may be the same or different. When the quantities of index slots are different, a byte size of the metadata may be adjusted, so that the metadata can completely represent a state of all the index slots. In addition, for the multi-way hash index mechanism, the present disclosure is not limited to a quantity and an implementation of the mapping manners.

To reduce access and storage overheads of the key-value pair data, the index structure may be implemented by using an inline storage mechanism, that is, key-value pair data that meets a preset condition is stored in an index slot in an inline manner. When the client needs to access the key-value pair data stored in the inline manner, the access may be implemented by accessing the index structure, without accessing the memory of the server, and without using a PCIe data channel between the smart network card and the server, thereby reducing access and storage pressure on the server.

As a possible implementation, whether the key-value pair data meets a requirement of the inline storage mechanism may be determined based on attribute information of the key-value pair data. The attribute information of the key-value pair data mentioned here may comprise but is not limited to a data type (such as int8, int16, int32, int64, float32, float64, and string) of a specific field, a data size, and the like.

Exemplarily, FIG. 6 is a schematic diagram of a data structure of an index slot in an index structure illustratively shown in the present disclosure. As shown in FIG. 6, when the inline storage mechanism is used, the index slot may comprise a field for indicating a data type of key-value pair data, a field for indicating a storage type of a key and a value, a field for storing related information about the key, and a field for storing related information about the value. The present disclosure is not limited to byte sizes of the fields.

In combination with the foregoing embodiment shown in FIG. 5, in the embodiment shown in FIG. 6, an example in which the index slot is 15 bytes is used for description. The index slot comprises four fields, namely, a 6-bit field (which may also be referred to as a type field) for indicating the data type, a 2-bit field (which may also be referred to as a Flag field) for indicating a storage manner of related information about the key and the value, an 8-byte field (which may also be referred to as a key-info field) for storing the related information about the key, and a 6-byte field (which may also be referred to as a value-info field) for storing the related information about the value.

The Flag field may have three values: 01, 10, and 11. When the value of the Flag field is 01, it indicates that both the key and the value in the key-value pair data can be stored in the index slot in an inline manner. When the value of the Flag field is 10, it indicates that the key in the key-value pair data can be stored in the index slot in an inline manner, but the value in the key-value pair data cannot be stored in the index slot in an inline manner. When the value of the Flag field is 11, it indicates that neither the key nor the value in the key-value pair data can be stored in the index slot in an inline manner.

As shown in the four index slots shown in FIG. 6, data of an Int32 type is stored in the index slot 1, data of a string type is stored in the index slot 2, and byte sizes of the key and the value both meet byte size limits of the key-info field and the value-info field. Therefore, the key and the value are stored in the index slot in the inline manner.

Data of an int64 type is stored in the index slot 3. A byte size of the key meets a byte size limit of the key-info field, but the value is greater than 6 bytes and cannot meet a byte size limit of the value-info field. Therefore, the key may be stored in the key-info field of the index slot in an inline manner, and the value-info field may be filled with pointer information corresponding to the key-value pair data, that is, the key-value pair data is stored in the memory of the server pointed to by the pointer information.

Data of a string type is stored in the index slot 4. A byte size of the key cannot meet a byte size limit of the key-info field. Therefore, the key-value pair data needs to be stored in a non-inline manner. As shown in FIG. 6, the key-info field may be used to store fingerprint digest information of the key in the key-value pair data, where the fingerprint digest information of the key may be data obtained by mapping the key and that meets a byte size limit of the key-info field, for example, is obtained by mapping the key through hash calculation. Certainly, the key may also be mapped in another manner to obtain the fingerprint digest information of the key. The value-info field may be filled with pointer information corresponding to the key-value pair data, that is, the key-value pair data is stored in the memory of the server pointed to by the pointer information.

Figure 7:
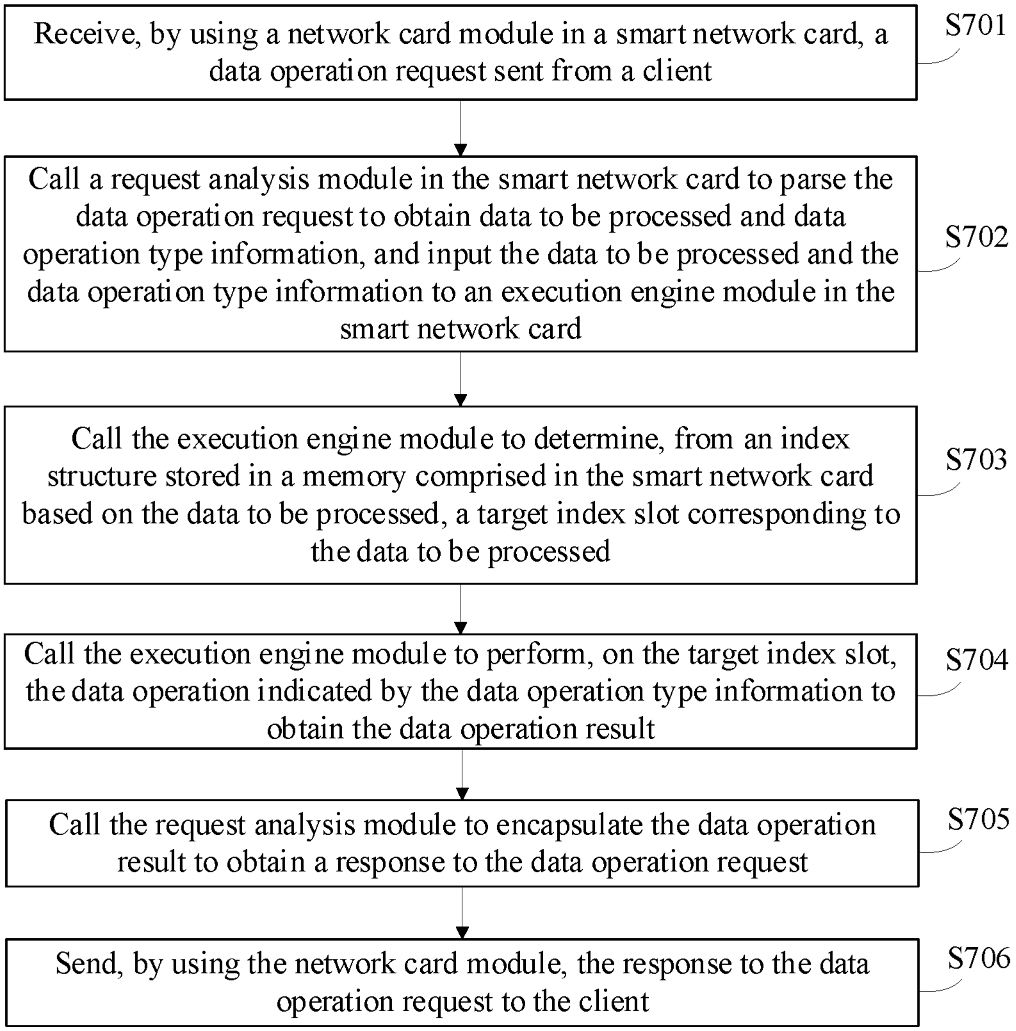
FIG. 7 is a schematic flowchart of a data processing method according to another embodiment of the present disclosure.
Figure 8:
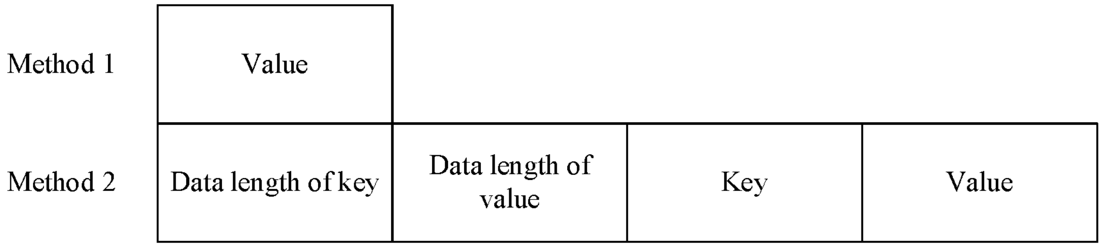
FIG. 8 is a schematic diagram of a data storage manner according to an embodiment of the present disclosure.
Figure 9:
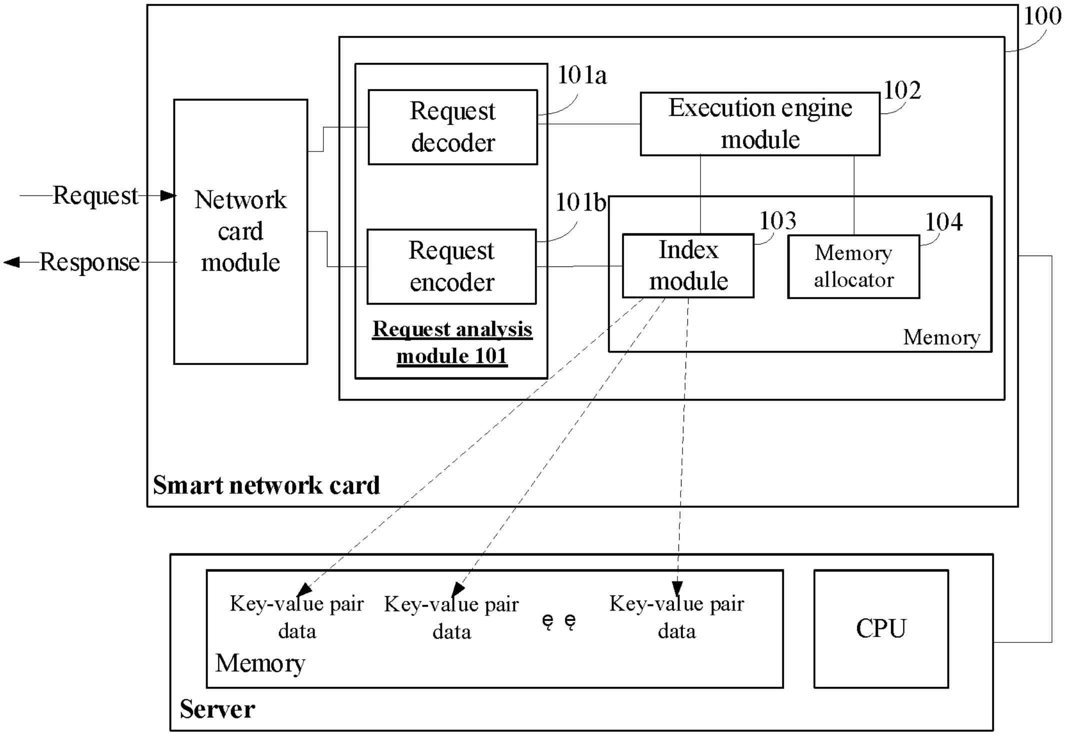
FIG. 9 is a schematic diagram of a structure of a data processing system according to an embodiment of the present disclosure.

Next, with reference to the embodiments shown in FIG. 7 to FIG. 9, the following describes in detail how the data processing system processes a data read request, a data write request, and a data delete request sent from a client in response to the index module being disposed in the memory of the smart network card and the index structure in the index module being implemented by using the hash bucket, the multi-way hash, and the inline storage mechanism.

FIG. 7 is a flowchart of a data processing method according to an embodiment of the present disclosure. As shown in FIG. 7, the method provided in this embodiment comprises the following steps.

S701: Receive, by using a network card module in a smart network card, a data operation request sent from a client.

S702: Call a request analysis module in the smart network card to parse the data operation request to obtain data to be processed and data operation type information, and input the data to be processed and the data operation type information into an execution engine module in the smart network card.

Steps S701 and S702 are similar to steps S301 and S302 in the embodiment shown in FIG. 3, and for details, refer to the detailed description of the embodiment shown in FIG. 3. Details are not described here for the sake of brevity.

S703: Call the execution engine module to determine, based on the data to be processed, a target index slot corresponding to the data to be processed from an index structure stored in a memory comprised in the smart network card.

In some embodiments, the index structure is implemented by using a hash bucket. The hash bucket comprises a plurality of index slots.

Determining the target index slot may be implemented by using, but not limited to, the following manner:

Step a: Call the execution engine module to perform hash calculation on the data to be processed to obtain a hash value, and perform matching in the index structure based on the hash value to obtain a hash bucket that is successfully matched.

The data processing system may use one or more hash algorithms to match the hash bucket. When the data to be processed is key-value pair data, a plurality of hash values may be obtained by calculating a key in the key-value pair data to be processed by using a plurality of hash algorithms, and the plurality of hash buckets may be matched based on the plurality of hash values.

In some embodiments, the calling the execution engine module to perform hash calculation on the data to be processed to obtain the hash value, and perform matching in the index structure based on the hash value to obtain the hash bucket that is successfully matched comprises: calling the execution engine module to separately perform hash calculation on the data to be processed by using a plurality of preset hash algorithms to obtain a plurality of hash values; and calling the execution engine module to match the plurality of hash values with identifiers of hash buckets comprised in the index structure to obtain a plurality of hash buckets that are successfully matched.

Step b: Call the execution engine module to perform matching in an index slot comprised in the hash bucket that is successfully matched based on the data to be processed to obtain a matching result, and determine the target index slot based on the matching result.

Exemplarily, when the data operation request is a data read request or a data delete request, matching may be performed in the plurality of hash buckets that are successfully matched based on a key or fingerprint digest information of the key in the key-value pair data to be processed, and an index slot that is successfully matched is the target index slot.

Exemplarily, when the data operation request is a data write request, an idle index slot may be allocated to the data to be processed as the target index slot based on an occupation status of an index slot in the plurality of hash buckets that are successfully matched or another factor. In combination with the embodiment shown in FIG. 5, the occupation status of the index slot may be obtained based on whether each bit in a Bitmap field of the hash bucket is 0 or 1. In some cases, when the data operation request is a data write request for modifying data, an index slot corresponding to the data to be modified is the target index slot.

When the matching is performed in the hash bucket, whether the matching is performed by using the data to be processed or the fingerprint digest information of the data to be processed may be determined based on attribute information of the data to be processed.

In some embodiments, the calling the execution engine module to perform matching in an index slot comprised in the hash bucket that is successfully matched based on the data to be processed to obtain a matching result comprises: calling the execution engine module to perform matching in the hash bucket that is successfully matched based on the data to be processed; or calling the execution engine module to calculate fingerprint digest information corresponding to the data to be processed, and perform matching in the hash bucket that is successfully matched based on the fingerprint digest information.

As a possible implementation, if the key in the key-value pair data to be processed meets a requirement of inline storage, the calling the execution engine module to perform matching in each index slot comprised in the hash bucket based on the key in the key-value pair data to be processed to determine an index slot in which related information about a filled key matches the key in the to-be-processed key-value pair as the target index slot. For example, in combination with the data structure in the embodiment shown in FIG. 6, an index slot in which a key filled in a key-info field is consistent with the key in the key-value pair data to be processed is determined as the target index slot.

As another possible implementation, if the key in the key-value pair data to be processed does not meet a requirement of inline storage, the calling the execution engine module to perform matching in each index slot comprised in the hash bucket based on fingerprint digest information of the key in the key-value pair data to be processed to determine an index slot in which related information about a filled key matches the fingerprint digest information of the key in the key-value pair to be processed as the target index slot. For example, in combination with the data structure in the embodiment shown in FIG. 6, an index slot in which fingerprint digest information of a key filled in a key-info field is consistent with fingerprint digest information of the key in the key-value pair data to be processed is determined as the target index slot.

S704: Call the execution engine module to perform, on the target index slot, the data operation indicated by the data operation type information to obtain the data operation result.

In some embodiments, in response to the data operation request being a data read request, step S704 comprises: in response to determining that both the data to be processed and target data corresponding to the data to be processed are stored in an inline manner, reading, from the target index slot, the target data indicated by the data to be processed; and in response to determining that the data to be processed is stored in the inline manner and the target data corresponding to the data to be processed is stored in a non-inline manner, or in response to determining that the data to be processed is stored in the non-inline manner, obtaining pointer information from the target index slot, and reading, from a memory of a server indicated by the pointer information, the target data corresponding to the data to be processed.

In some other embodiments, in response to the data operation request being a data delete request, step S704 comprises: in response to determining that both the data to be processed and target data indicated by the data to be processed are stored in an inline manner, deleting the target index slot; and in response to determining that the data to be processed is stored in the inline manner and the target data indicated by the data to be processed is stored in a non-inline manner, or in response to determining that the data to be processed is stored in the non-inline manner, obtaining pointer information from the target index slot, deleting data in a memory of a server indicated by the pointer information, and releasing the target index slot.

In some embodiments, the deleting data in the memory of the server indicated by the pointer information comprises: controlling, by using the execution engine module, a memory management module of the smart network card to release the memory of the server indicated by the pointer information, where the memory management module is configured to manage the memory of the server.

Based on different data operation requests and in combination with an inline storage manner and a non-inline storage manner used by an index, the following describes how an execution engine module of the data processing system executes the data operation requests by using several different examples.

Example 1: The data operation request is a data read request, and a value of a Flag field in the target index slot is 01.

If the value of the Flag field in the target index slot is 01, it indicates that key-value pair data to be read is stored in the target index slot in an inline manner. The execution engine module may be called to read value data from a value-info field in the target index slot. The execution engine module may determine a data type of the value data based on a type field in the target index slot.

Example 2: The data operation request is a data read request, and a value of a Flag field in the target index slot is 10 or 11.

If the value of the Flag field in the target index slot is 10 or 11, it indicates that the key-value pair data to be read is stored in the memory of the server. The execution engine module may be called to read pointer information from the value-info field in the target index slot, and read the value data from the memory of the server based on the pointer information. The execution engine module may determine a data type of the value data based on the type field in the target index slot.

Example 3: The data operation request is a data delete request, and a value of a Flag field in the target index slot is 01.

If the value of the Flag field in the target index slot is 01, it indicates that key-value pair data to be deleted is stored in the target index slot in an inline manner. The execution engine module may release the target index slot, to complete data deletion.

Example 4: The data operation request is a data delete request, and a value of a Flag field in the target index slot is 10 or 11.

If the value of the Flag field in the target index slot is 10 or 11, it indicates that the key-value pair data to be deleted is stored in the memory of the server. The execution engine module may be called to read pointer information from the value-info field in the target index slot, delete key-value pair data in the memory pointed to by the pointer information in the memory of the server, and release the memory of the server occupied by the key-value pair data. The execution engine module is called to release the target index slot, to complete data deletion.

Example 5: The data operation request is a data write request, and a key and a value in the key-value pair data to be processed can be stored in an inline manner.

The execution engine module is called to fill 01 in a Flag field in the target index slot; fill a data type of the key-value pair data to be processed in a type field in the target index slot; fill a key in the key-value pair data to be processed in a key-info field; and fill a value in the key-value pair data to be processed in a value-info field.

Example 6: The data operation request is a data write request, the key in the key-value pair data to be processed can be stored in an inline manner, and the value is stored in a non-inline manner.

The execution engine module is called to fill 10 in a Flag field in the target index slot; fill a data type of the key-value pair data to be processed in a type field in the target index slot; fill a key in the key-value pair data to be processed in a key-info field; allocate the memory of the server to the key-value pair data to be processed, generate pointer information based on an address of the allocated memory of the server, and fill the pointer information in a value-info field. The execution engine module is called to deliver the key-value pair data to be processed to the server, so that the server stores the key-value pair data to be processed in the allocated memory of the server.

Example 7: The data operation request is a data write request, and the key in the key-value pair data to be processed is stored in a non-inline manner.

If the key in the key-value pair data to be processed is stored in the non-inline manner, the value in the key-value pair data to be processed is also stored in the non-inline manner, and fingerprint digest information of the key and the pointer information in the key-value pair data to be processed need to be stored in the target index slot. Therefore, the execution engine module may be called to fill 11 in a Flag field in the target index slot; fill a data type of the key-value pair data to be processed in a type field in the target index slot; fill fingerprint digest information of the key in the key-value pair data to be processed in a key-info field; allocate the memory of the server to the key-value pair data to be processed, generate pointer information based on an address of the allocated memory of the server, and fill the pointer information in a value-info field. The execution engine module is called to deliver the key-value pair data to be processed to the server, so that the server stores the key-value pair data to be processed in the allocated memory of the server.

As a possible implementation, the memory of the server may support the following two manners of data storage:

Manner 1: If a key in the key-value pair data is stored in an inline manner, and a data length can be determined based on a data type of the key-value pair data, only a value in the key-value pair data to be processed may be stored in the memory of the server. Exemplarily, when the key-value pair data is stored in the memory of the server in the manner 1, a data structure may be as shown in the manner 1 in FIG. 8.

Manner 2: If the key in the key-value pair data is stored in a non-inline manner, or the key in the key-value pair data is stored in an inline manner, and the data length cannot be determined based on the data type of the key-value pair data, both the key and the value in the key-value pair data and data lengths of the key and the value need to be stored in the memory of the server. Exemplarily, when the key-value pair data is stored in the memory of the server in the manner 2, a data structure may be as shown in the manner 2 in FIG. 8. It should be noted that when the key-value pair data is stored in the manner 2, the data structure may also be implemented in another manner. For example, the key-value pair data is first stored, and then information about the data length of the key and the data length of the value in the key-value pair data is stored. Alternatively, the data may be stored in an order of the key in the key-value pair data, the information about the data length of the key, the value in the key-value pair data, and the information about the data length of the value. This is not limited in the present disclosure.

The memory of the server stores the key-value pair data in the manner 1, so that unnecessary memory space occupation overheads of the key and related data in the key-value pair data can be avoided, thereby improving utilization of the memory of the server. In addition, in the manner 2, information about the data length is stored in the memory of the server, so that an execution engine of the data processing system can correctly process an access boundary of the data, so that the data operation request sent from the client can be correctly processed without an error.

In combination with the scenario shown in the foregoing example 2, if data to be read is stored in the manner 1, the value in the key-value pair data is read from the memory of the server. If data to be read is stored in the manner 2, the execution engine reads the key-value pair data and information about the data length of the key-value pair data from the memory of the server. In the scenario shown in the foregoing example 4, if data to be deleted is stored in the manner 1, the value stored in the key-value pair data is deleted from the memory of the server. If data to be deleted is stored in the manner 2, the key-value pair data and the information about the data length of the key-value pair data are deleted from the memory of the server. In the scenarios shown in the examples 6 and 7, if a requirement of the manner 1 is met, the key in the key-value pair data may be stored in the memory of the server. If a requirement of the manner 2 is met, both the key-value pair data and the information about the data length of the key-value pair data are stored in the memory of the server.

S705: Call the request analysis module to encapsulate the data operation result to obtain a response to the data operation request.

S706: Send, by using the network card module, the response to the data operation request to the client.

Steps S705 and S706 in this embodiment are similar to steps S304 and S305 in the embodiment shown in FIG. 3. For details, refer to the detailed description of the embodiment shown in FIG. 3. Details are not described here for the sake of brevity.

In this embodiment, the data processing system uses sub-index structure organization and a multi-way index, and spatial locality of a cache of the sub-index structure is used to greatly reduce access overheads caused by accessing a same sub-index structure, so that memory utilization of the smart network card can be improved. In addition, the index structure is implemented by using an inline storage mechanism, so that access and storage overheads of small key-value pair data can be optimized, thereby reducing access pressure on the memory of the server and improving data processing efficiency.

In combination with the descriptions of the examples 5 to 7 in step S705 in the embodiment shown in FIG. 7, the data to be processed needs to be written into the memory of the server, and the smart network card needs to interact with the server to request the server to allocate a memory space for data writing. If the server is separately requested for each data writing operation, the smart network card needs to frequently interact with a CPU of the server, which may become a performance bottleneck of the key-value pair data operation. To solve this problem, in the present disclosure, a memory allocator is disposed in the data processing system. The memory allocator may be implemented by using a manner of combining pre-application and slab management to implement near-network card host memory management.

FIG. 9 is a schematic diagram of a structure of a data processing system according to an embodiment of the present disclosure. As shown in FIG. 9, on the basis of the embodiment shown in FIG. 4, the data processing system provided in this embodiment further comprises a memory allocator 104.

The memory allocator 104 is disposed in the memory of the smart network card, and is mainly responsible for applying for an idle storage space from the host memory of the server and managing the idle storage space. When the data processing system is provided with the memory allocator 104, the execution engine module 102 may further need to interact with the memory allocator 104 when processing the data operation request sent from the client.

As a possible implementation, when storage resources are insufficient, the memory allocator 104 interacts with the CPU of the server to apply for a memory space of a preset size. The preset size is not limited. For example, a large memory space of several hundred megabytes may be applied for at a time.

The memory allocator 104 may perform local management on the memory of the server by using a slab management mechanism. Specifically, the memory allocator 104 may manage idle memories of different sizes by using different orders, and each order represents a linked list structure with a fixed memory block size.

Figure 10:
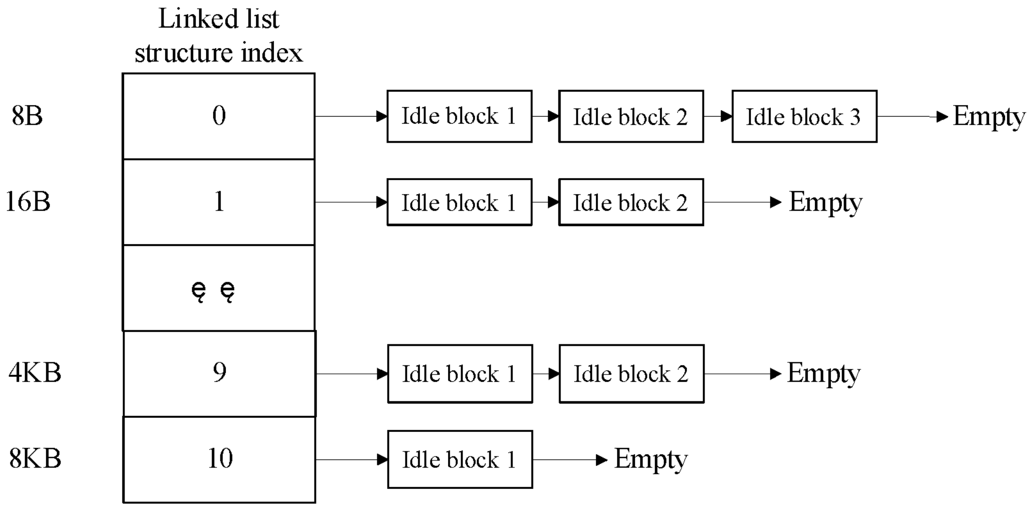
FIG. 10 is a schematic diagram of a structure of a memory management mechanism used by a memory allocator according to an embodiment of the present disclosure.

For example, referring to a schematic diagram of a structure of the management mechanism shown in FIG. 10, the memory allocator 104 comprises 11 orders, namely, order 0 to order 10. Order 0 to order 10 sequentially represent linked list structures with memory block sizes of 8 B, 16 B, 32 B, 64 B, 128 B, 256 B, 512 B, 1 KB, 2 KB, 4 KB, and 8 KB. In the foregoing 11 orders, memory allocation of up to 8 KB may be supported (excluding some metadata interference, storage of key-value pair data of up to 4 KB may be supported).

It should be noted that when the slab management mechanism is used, a quantity of orders and a memory block size corresponding to each order may be set based on an actual requirement. The embodiment shown in FIG. 10 is merely an example, and is not a limitation on an implementation of the memory allocator 104 managing the host memory.

According to the local management mechanism of the memory of the server by using the memory allocator, when the data processing system deletes or writes the key-value pair data, the memory allocator may be used to complete allocation and release of a memory resource of the server, without interacting with the CPU of the server, thereby significantly reducing overall performance overheads of the data processing system, reducing operation latency, and improving throughput.

Figure 11:
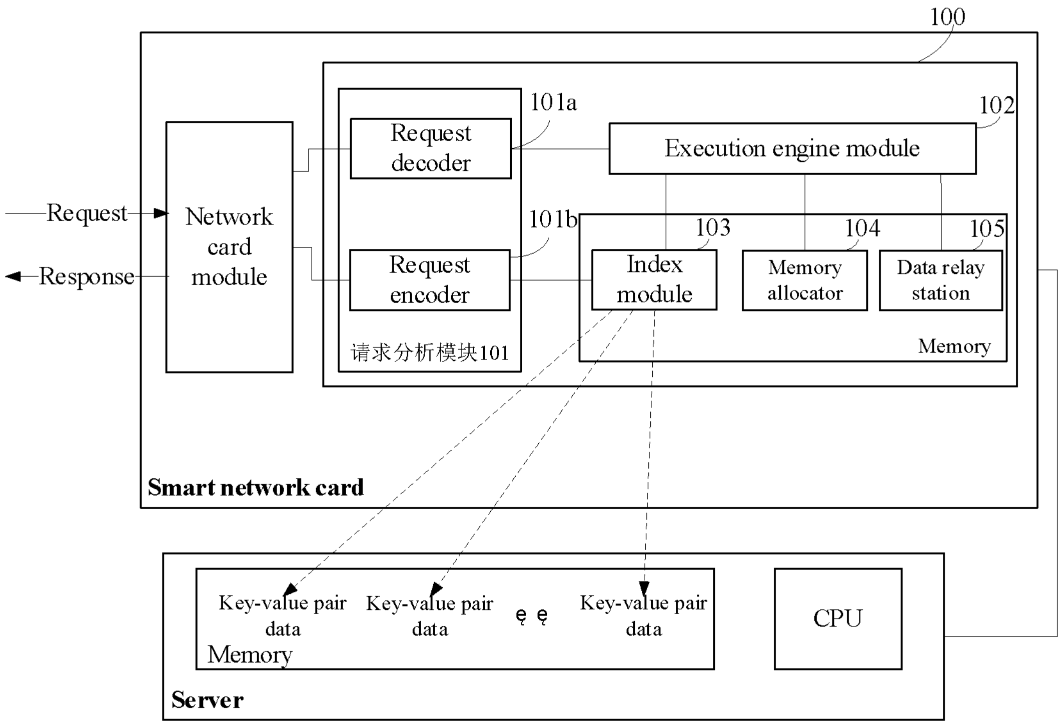
FIG. 11 is a schematic diagram of a structure of a data processing system according to another embodiment of the present disclosure.

According to the foregoing embodiments, it can be learned that the execution engine module 102 is a core functional module connected to another component module in the data processing apparatus 100. To further improve processing efficiency of the data processing system in executing the data operation request, in the data processing apparatus 100 provided in the present disclosure, a data relay station may be disposed in the smart network card, to reduce a plurality of accesses to the memory of the server caused by an operation on hot key-value pair data, thereby optimizing overall performance of the data processing system. FIG. 11 is a schematic diagram of a structure of a data processing system according to an embodiment of the present disclosure. As shown in FIG. 11, the data processing apparatus 100 further comprises a data relay station 105 disposed in the memory of the smart network card.

The data relay station 105 is mainly configured to cache key-value pair data that meets a preset requirement. When the execution engine module 102 executes the data operation request, the execution engine module 102 may first access the data relay station for matching. For example, the data relay station may cache key-value pair data with a data size that meets a preset requirement (for example, key-value pair data with a length of a key and a length of a value both within 8 bytes).

As a possible implementation, the data relay station 105 may be implemented by using a structure based on a chained hash index. By using this structure, an operation on a same key may be mapped to a fixed linked list each time for matching.

Figure 12:
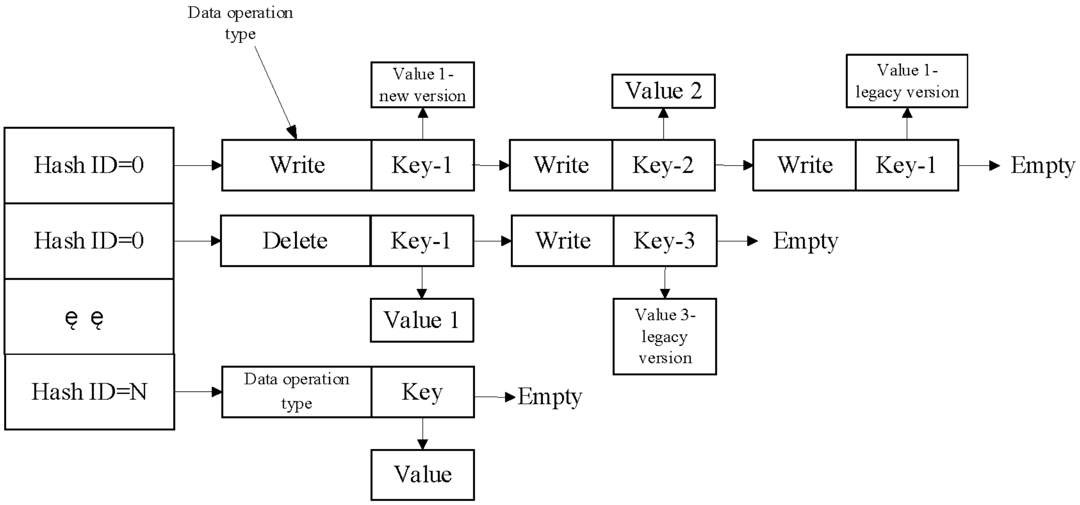
FIG. 12 is a schematic diagram of a structure of a data relay station according to an embodiment of the present disclosure.

FIG. 12 illustratively shows a schematic diagram of a structure of the data relay station. The data relay station 105 comprises a plurality of linked list structures, each linked list structure corresponds to an identifier (such as a hash ID shown in FIG. 12), hash calculation is performed on a key in key-value pair data to be processed to obtain a hash value, and a hash ID corresponding to each linked list is queried based on the hash value, to be mapped to a corresponding target linked list structure, and an operation is performed in the target linked list structure.

When processing a data read request, the execution engine module 102 may first perform matching in the data relay station 105, to determine whether there is a matched key in the data relay station 105. If matching is successful, a latest version of a value corresponding to the key is returned. If matching fails, null is returned, to indicate that there is no corresponding key in the data relay station 105.

When processing the data write request and the data delete request, the execution engine module 102 atomically adds a data item to a target linked list structure obtained through hashing. The data item comprises a field for indicating a data operation type, a field for containing a key, and a field for containing a value. In addition, the execution engine module 102 deletes a data item of a same key in the target linked list structure.

Figure 13:
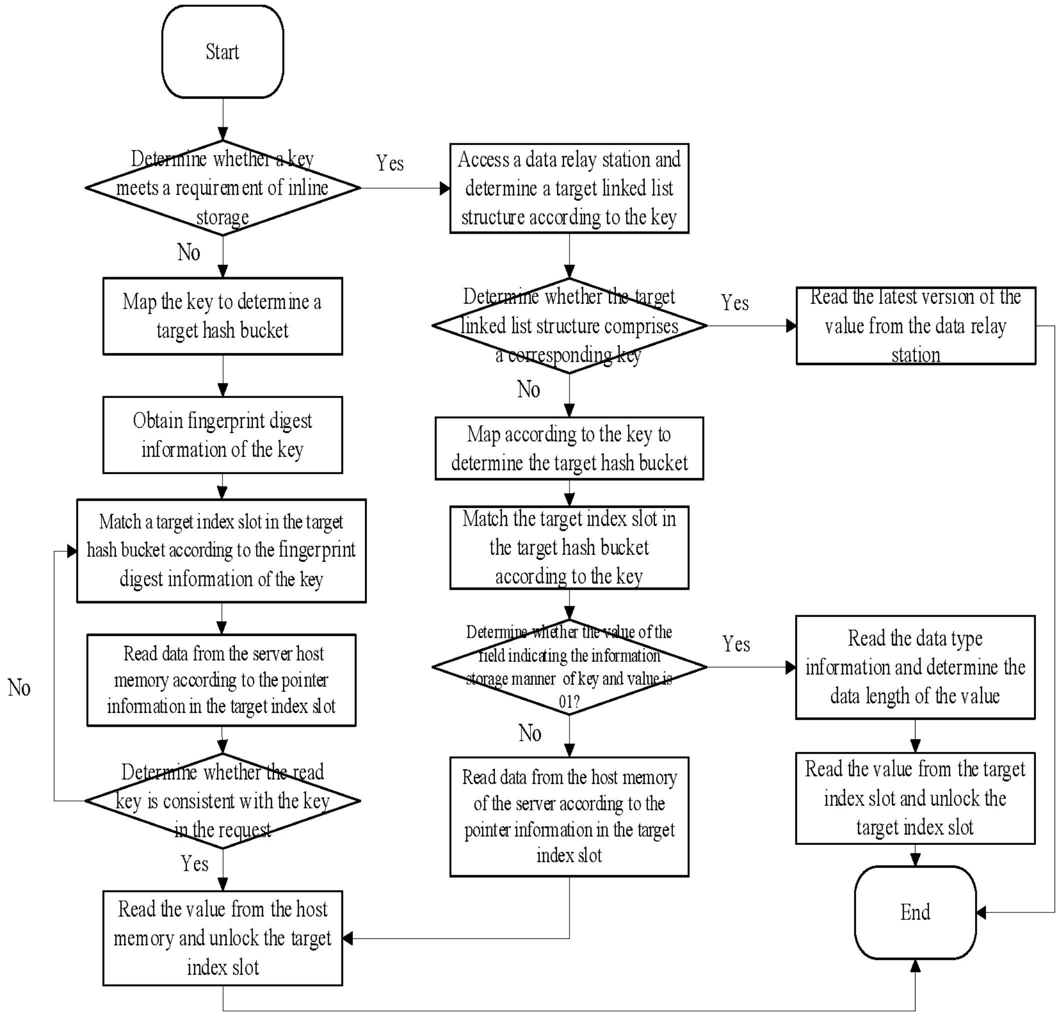
FIG. 13 is a schematic flowchart of a data processing method according to another embodiment of the present disclosure.
Figure 14:
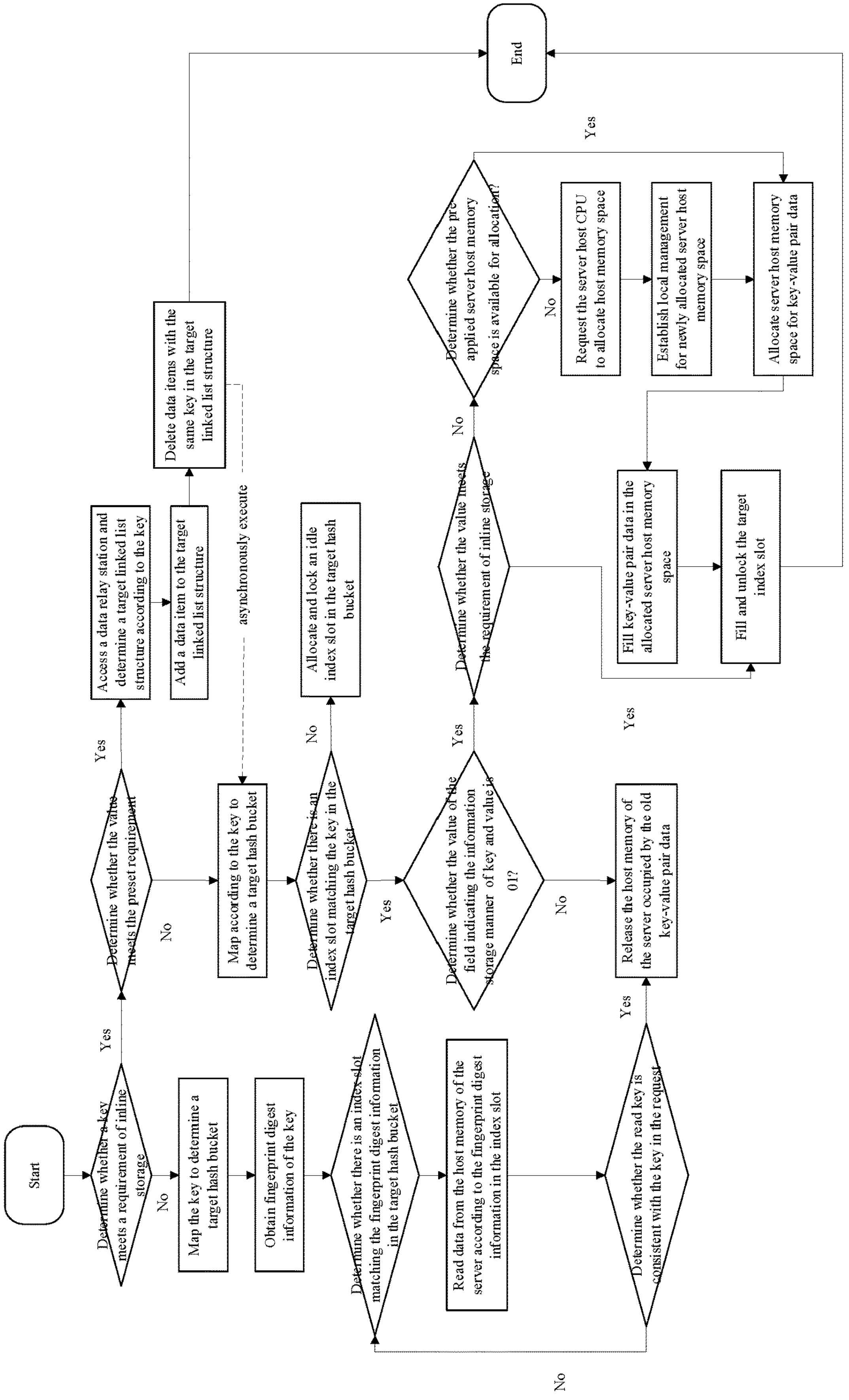
FIG. 14 is a schematic flowchart of a data processing method according to another embodiment of the present disclosure.
Figure 15:
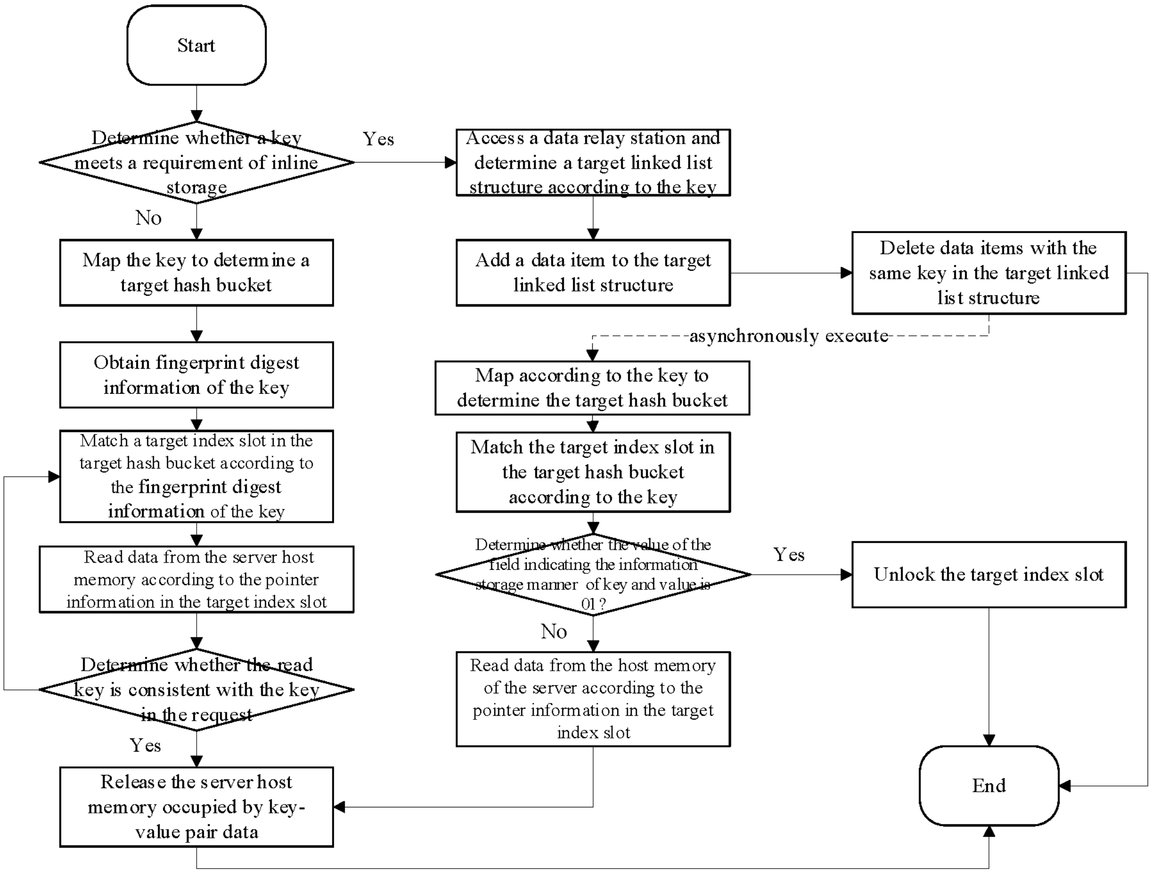
FIG. 15 is a schematic flowchart of a data processing method according to another embodiment of the present disclosure.

Next, how the data processing system shown in the embodiment in FIG. 11 implements data reading, data deletion, and data writing is described in detail by using the embodiments shown in FIG. 13 to FIG. 15.

FIG. 13 is a flowchart of a data processing method according to an embodiment of the present disclosure. As shown in FIG. 13, in this embodiment, the data operation request sent from the client is a data read request. When the data processing system receives the data read request sent from the client, the request decoder parses the data read request to obtain the key-value pair data to be processed and the information about the data operation type, and delivers the key-value pair data to be processed and the information about the data operation type to the execution engine module. First, the execution engine module needs to determine whether a key in the data read request meets a requirement of inline storage. For example, it may be determined based on a size of the key. Assuming that the size of the key is within 8 bytes, the requirement of the inline storage is met. If the size of the key is greater than 8 bytes, the requirement of the inline storage is not met.

If the key meets the requirement of the inline storage, the execution engine module is called to access the data relay station, to check whether there is a latest version of a value corresponding to the key in the data relay station. If a corresponding data item is found, the latest version of the value is returned.

If the key meets the requirement of the inline storage, but the latest version of the value corresponding to the key is not found in the data relay station, the execution engine module is called to access the index module to query the index structure, the key is mapped to two hash buckets by using two hash algorithms, and a target index slot is determined based on matching performed on the two hash buckets obtained through hashing based on the key. Next, a length of data to be read and a location from which the data is to be read are determined based on a Flag field and a type field in the target index slot. If a value of the Flag field is 01, type information is read from the target index slot to determine a data length of the value, and the value is read from the target index slot. Then, the target index slot is unlocked. If the value of the Flag field is 10, pointer information is read from the target index slot, and the key-value pair data is read from the memory of the server based on the pointer information. If the key does not meet the requirement of the inline storage, the key is first mapped to two hash buckets by using two hash algorithms (in this embodiment, the two hash buckets are used as an example), and then fingerprint digest information of the key is calculated. Matching is performed in the hash buckets obtained through hashing based on the fingerprint digest information of the key, to determine the target index slot. It should be noted that during the matching process, the fingerprint digest information of the key may be matched with a plurality of index slots, that is, a quantity of target index slots may be a plurality of target index slots. Next, the key-value pair data is read from the memory of the server based on the pointer information in the target index slot. If a key in the key-value pair data read from the memory of the server is also completely matched, a value read from the memory of the server is returned. If the key in the key-value pair data read from the memory of the server is not matched, a next target index slot is matched, and the foregoing process is repeated.

FIG. 14 is a flowchart of a data processing method according to an embodiment of the present disclosure. As shown in FIG. 14, in this embodiment, the data operation request sent from the client is a data write request. When the data processing system receives the data write request sent from the client, the request decoder parses the data write request to obtain the key-value pair data to be processed and the information about the data operation type, and delivers the key-value pair data to be processed and the information about the data operation type to the execution engine module. First, the execution engine module needs to determine whether a key in the data write request meets a requirement of inline storage. For example, it may be determined based on a size of the key. Assuming that the size of the key is within 8 bytes, the requirement of the inline storage is met. If the size of the key is greater than 8 bytes, the requirement of the inline storage is not met.

If the key meets the requirement of the inline storage, it is further required to determine whether the key-value pair data to be written is small key-value pair data. If the key-value pair data to be written is the small key-value pair data, the data needs to be written into the data relay station. If the key-value pair data to be written is not the small key-value pair data, the data needs to be written into the target index slot or the memory of the server. Specifically, if a size of a value meets a preset requirement (for example, the preset requirement is a size of 8 bytes), the key is hashed to a target linked list structure in the data relay station, and a PUT data item is added to a header of the target linked list structure. Then, the target linked list structure is traversed to delete all data items comprising the key. After the foregoing process is completed, a return can be performed, and subsequent steps may be asynchronously executed.

The steps that need to be asynchronously executed shown in FIG. 14 are the same as steps synchronously executed by the execution engine module in a case that the value does not meet the preset requirement. That is, the key is hashed to two hash buckets by using two hash algorithms (in the embodiment shown in FIG. 14, two hash buckets are used as an example for description), and matching is performed in the two hash buckets based on the key. If matching is successful, a memory space of the server occupied by old key-value pair data is released.

Next, the execution engine module determines whether the value meets a requirement of inline storage. For example, based on a data structure of the index slot in the embodiment shown in FIG. 5, it may be determined whether the value meets the requirement of the inline storage by determining whether the value is less than 6 bytes. If it is determined that the value can be stored in the inline manner, the target index slot is filled based on the key-value pair data, and a return is performed. If it is determined that the value cannot be stored in the inline manner, it is required to determine, by using the memory allocator, whether there are sufficient memory resources. If there are sufficient memory resources, a memory space is directly allocated to the key-value pair data, and the key-value pair data is filled in the allocated memory space. Then, the target index slot is filled, and a return is performed. If there are insufficient memory resources, a CPU of the server is requested to pre-allocate a segment of memory resources (a size of the memory resources to be allocated may be flexibly set), and then hierarchical management is established for the segment of memory resources. Then, a memory space is allocated to the key-value pair data to be written, and the key-value pair is filled in the allocated memory space. Then, the index slot is filled, and a return is performed.

If the key does not meet the requirement of the inline storage, the execution engine module may perform hash calculation on the key by using a hash algorithm, to hash the key to two hash buckets (in the embodiment shown in FIG. 14, two hash buckets are used as an example for description). Then, fingerprint digest information of the key is calculated, and an index slot is matched in the hash bucket based on the fingerprint digest information of the key. If matching is successful, the execution engine module reads corresponding key-value pair data from the memory of the server to match whether the key is consistent. If the key is consistent, the execution engine module releases a memory space occupied by the old key-value pair data, and then performs a key-value pair data writing process. If matching is not successful in the two hash buckets based on the fingerprint digest information of the key, an idle index slot is allocated and locked for the key-value pair data currently to be written, and then the key-value pair data writing process is performed.

For the key-value pair data writing process, refer to the foregoing related description of writing based on whether a size of the value meets the requirement of the inline storage in the asynchronously executed steps. Details are not described here for the sake of brevity.

FIG. 15 is a flowchart of a data processing method according to an embodiment of the present disclosure. As shown in FIG. 15, in this embodiment, the data operation request sent from the client is a data delete request. When the data processing system receives the data delete request sent from the client, the request decoder parses the data delete request to obtain the key-value pair data to be processed and the information about the data operation type, and delivers the key-value pair data to be processed and the information about the data operation type to the execution engine module. First, the execution engine module needs to determine whether a key in the data delete request meets a requirement of inline storage. For example, it may be determined based on a size of the key. Assuming that the size of the key is within 8 bytes, the requirement of the inline storage is met. If the size of the key is greater than 8 bytes, the requirement of the inline storage is not met.

If the key meets the requirement of the inline storage, it is further required to determine whether the key-value pair data to be deleted is small key-value pair data. If the key-value pair data to be deleted is the small key-value pair data, a search needs to be preferentially performed in the data relay station. If the key-value pair data to be deleted is not the small key-value pair data, a search needs to be performed in the host memory of the server. Specifically, if a size of a value meets a preset requirement (for example, the preset requirement is a size of 8 bytes), the key is hashed to a target linked list structure in the data relay station, a DEL data item is added to a header of the target linked list structure, and the key-value pair data is written into the DEL data item. After data items of a same key in the target linked list structure are deleted, a return can be performed, and the remaining steps may be asynchronously executed. The logic of the asynchronously executed steps is similar to that of the write operation. That is, hash calculation is performed on the key by using a hash algorithm, to hash the key to two hash buckets (in the embodiment shown in FIG. 15, two hash buckets are used as an example for description), and matching is performed in the two hash buckets based on the key. If matching is successful, whether data is stored in a target index slot or the memory of the server is further determined based on a value of a Flag field in the target index slot that is successfully matched. If the Flag field is 01, the target index slot is unlocked, and a memory occupied by the key-value pair data is released. If the Flag field is 10, the key-value pair data is read from the memory of the server based on pointer information in the target index slot, a memory occupied by the key-value pair data is released, the target index slot is unlocked, and then a return is performed.

If the key does not meet the requirement of the inline storage, the key is hashed to two hash buckets by using a hash algorithm, and then fingerprint digest information of the key is calculated. Matching is performed in the hash buckets based on the fingerprint digest information of the key. It should be noted that a quantity of index slots matched with the fingerprint digest information of the key in the two hash buckets may be a plurality of index slots, that is, a quantity of target index slots may be a plurality of target index slots. Pointer information is read from a target index slot that is successfully matched, and the key-value pair data is read from the memory of the server based on the pointer information. If it is determined that a key in the read key-value pair data is consistent, a memory occupied by the key-value pair data is released, the target index slot is unlocked, and then a return is performed. If it is determined that the key in the read key-value pair data is not consistent, pointer information in a next target index slot is continuously read for matching, and the foregoing process is repeated. In combination with the foregoing embodiments, in the present disclosure, some workloads of a CPU of the server are migrated to the smart network card, and the smart network card processes the data operation request sent from the client. The smart network card presents an access abstraction of the KVS to the client node, without requiring the CPU of the server to participate in processing of the data operation request. In addition, the data processing system greatly reduces a performance bottleneck of the server and improves access overheads of the in-memory key-value database by using a sub-index structure organization and multi-way index mechanism, an inline storage mechanism, a data relay station acceleration structure, and a manner of implementing pre-application and local management of the memory of the server by using the memory allocator. For the client, low latency can bring a better experience to the client.

In the embodiments shown in FIG. 13 to FIG. 15, if the key-value pair data stored in the data relay station has a requirement for a size of a key but no requirement for a size of a value, when it is determined whether to perform a query in the data relay station, it is also possible to determine whether the size of the key meets a preset condition, without determining the size of the value.

In some embodiments of the present disclosure, a data processing apparatus is further provided. The data processing apparatus comprises a network card module, a request analysis module, and an execution engine module.

The network card module is configured to receive a data operation request sent from a client.

The request analysis module is configured to parse the data operation request received to obtain data to be processed and data operation type information, and input the data to be processed and the data operation type information to the execution engine module.

The execution engine module is configured to perform, based on the data to be processed, a data operation indicated by the data operation type information to obtain a data operation result.

The request analysis module is further configured to encapsulate the data operation result to obtain a response to the data operation request.

The network card module is further configured to send the response to the data operation request to the client. In some embodiments, the request analysis module is configured to update a target field in a data structure corresponding to the data operation request based on the data operation result to obtain the response to the data operation request.

In some embodiments, the network card module is configured to receive a plurality of data operation requests that are sent from the client and have a same transaction identifier.

In some embodiments, the request analysis module is configured to respectively parse the plurality of data operation requests that have the same transaction identifier to obtain a plurality of data fields and a plurality of identical data operation type information items, and splice the plurality of data fields to be processed based on sequence indication information respectively comprised in the plurality of data operation requests to obtain the data to be processed.

In some embodiments, the plurality of data operation requests that have the same transaction identifier have a same data structure.

In some embodiments, the execution engine module is configured to determine, from an index structure stored in a memory comprised in the smart network card based on the data to be processed, a target index slot corresponding to the data to be processed, and perform, on the target index slot, the data operation indicated by the data operation type information to obtain the data operation result.

In some embodiments, the index structure is implemented by using a hash bucket, wherein the hash bucket comprises a plurality of index slots.

In some embodiments, the execution engine module is configured to perform hash calculation on the data to be processed to obtain a hash value, match in the index structure based on the hash value to obtain a successfully matched hash bucket, perform matching in index slots comprised in the successfully matched hash bucket based on the data to be processed to obtain a matching result, and determine the target index slot based on the matching result.

In some embodiments, the execution engine module is configured to perform hash calculation on the data to be processed by using a plurality of preset hash algorithms respectively to obtain a plurality of hash values, and match the plurality of hash values with identifiers of hash buckets comprised in the index structure to obtain a plurality of successfully matched hash buckets.

In some embodiments, the execution engine module is configured to perform matching in the successfully matched hash buckets based on the data to be processed; or the execution engine module is configured to calculate fingerprint digest information corresponding to the data to be processed, and perform matching in the successfully matched hash buckets based on the fingerprint digest information.

In some embodiments, in response to the data operation request being a data read request, the execution engine module is configured to: in response to determining that both the data to be processed and target data corresponding to the data to be processed are stored in an inline manner, read, from the target index slot, the target data indicated by the data to be processed; and in response to determining that the data to be processed is stored in the inline manner and the target data corresponding to the data to be processed is stored in a non-inline manner, or in response to determining that the data to be processed is stored in the non-inline manner, obtain pointer information from the target index slot, and read, from the memory of the server indicated by the pointer information, the target data corresponding to the data to be processed.

In some embodiments, in response to the data operation request being a data delete request, the execution engine module is configured to: in response to determining that both the data to be processed and target data indicated by the data to be processed are stored in an inline manner, delete the target index slot; and in response to determining that the data to be processed is stored in the inline manner and the target data indicated by the data to be processed is stored in a non-inline manner, or in response to determining that the data to be processed is stored in the non-inline manner, obtain pointer information from the target index slot, delete data in the memory of the server indicated by the pointer information, and release the target index slot.

In some embodiments, the execution engine module is configured to control a memory management module of the smart network card to release the memory of the server indicated by the pointer information, wherein the memory management module is configured to manage the memory of the server.

Exemplarily, an embodiment of the present disclosure further provides an electronic device. The electronic device comprises a memory and a processor. The present disclosure does not limit a type of the memory and a type of the processor, and the like. The memory and the processor may be connected through a data bus. The memory is configured to store computer program instructions, and the processor is configured to execute the computer program instructions to cause the electronic device to implement the data processing method shown in any one of the foregoing method embodiments.

Exemplarily, an embodiment of the present disclosure further provides a computer-readable storage medium. The computer-readable storage medium comprises computer program instructions. The computer program instructions, when executed by at least one processor of an electronic device, cause the electronic device to implement the data processing method shown in any one of the foregoing method embodiments.

Exemplarily, an embodiment of the present disclosure further provides a computer program product. The computer program product, when executed by an electronic device, causes the electronic device to implement the data processing method shown in any one of the foregoing method embodiments.

Exemplarily, an embodiment of the present disclosure further provides a computer program comprising instructions. The instructions, when executed by a processor, cause the processor to execute the data processing method shown in any one of the foregoing method embodiments.

It should be noted that in this specification, relational terms such as “first” and “second” are merely used to distinguish one entity or operation from another entity or operation, but do not necessarily require or imply any actual relationship or order between these entities or operations. Moreover, the terms “include”, “comprise”, or any other variant thereof are intended to cover a non-exclusive inclusion. Therefore, a process, a method, an article, or a device that comprises a series of elements not only comprises those elements, but also comprises other elements not explicitly listed, or further comprises elements inherent to such a process, a method, an article, or a device. Without more restrictions, an element defined by a statement “comprising a/an . . . ” does not exclude another same element existing in a process, a method, an article, or a device that comprises the element.

The foregoing descriptions are merely specific implementations of the present disclosure, so that those skilled in the art can understand or implement the present disclosure. Various modifications to these embodiments are obvious to those skilled in the art, and the general principles defined herein may be implemented in other embodiments without departing from the spirit or scope of the present disclosure. Therefore, the present disclosure is not limited to the embodiments described herein, but should comply with the widest scope consistent with the principles and novel features disclosed herein.

The invention claimed is:

1. A data processing method, comprising:

receiving, by a network card module in a smart network card, a data operation request sent from a client;

calling a request analysis module in the smart network card to parse the data operation request to obtain data to be processed and data operation type information;

inputting the data to be processed and the data operation type information to an execution engine module in the smart network card;

calling the execution engine module in the smart network card to perform, based on the data to be processed, a data operation indicated by the data operation type information to obtain a data operation result, wherein performing the data operation comprises determining, using an index structure stored in a memory of the smart network card, a location at which the data to be processed is to be stored or accessed;

calling the request analysis module in the smart network card to encapsulate the data operation result to obtain a response to the data operation request; and sending, by the network card module in the smart network card, the response to the data operation request to the client.

2. The data processing method according to claim 1, wherein the calling the request analysis module to encapsulate the data operation result to obtain the response to the data operation request comprises:

calling the request analysis module to update a target field in a data structure corresponding to the data operation request based on the data operation result to obtain the response to the data operation request.

3. The data processing method according to claim 1, wherein the receiving, by the network card module in the smart network card, the data operation request sent from the client comprises:

receiving, by the network card module, a plurality of data operation requests that are sent from the client and have a same transaction identifier.

4. The data processing method according to claim 3, wherein the calling the request analysis module in the smart network card to parse the data operation request to obtain the data to be processed and the data operation type information comprises:

calling the request analysis module to respectively parse the plurality of data operation requests that have the same transaction identifier to obtain a plurality of data fields and a plurality of identical data operation type information items; and calling the request analysis module to splice the plurality of data fields to be processed based on sequence indication information respectively comprised in the plurality of data operation requests to obtain the data to be processed.

5. The data processing method according to claim 3, wherein the plurality of data operation requests that have the same transaction identifier have a same data structure.

6. The data processing method according to claim 1, wherein the calling the execution engine module to perform, based on the data to be processed, the data operation indicated by the data operation type information to obtain the data operation result comprises:

calling the execution engine module to determine, from the index structure stored in the memory of the smart network card based on the data to be processed, an index slot corresponding to the data to be processed; and calling the execution engine module to perform, on the target index slot, the data operation indicated by the data operation type information to obtain the data operation result.

7. The data processing method according to claim 6, wherein:

the index structure is implemented by using a hash bucket, wherein the hash bucket comprises a plurality of index slots; and the calling the execution engine module to determine, from the index structure stored in the memory comprised in the smart network card based on the data to be processed, the target index slot corresponding to the data to be processed comprises:

calling the execution engine module to perform hash calculation on the data to be processed to obtain a hash value, and match the hash value and the hash bucket in the index structure based on the hash value to obtain a successfully matched hash bucket; and calling the execution engine module to perform matching in index slots comprised in the successfully matched hash bucket based on the data to be processed to obtain a matching result, and determine the target index slot based on the matching result.

8. The data processing method according to claim 7, wherein the calling the execution engine module to perform hash calculation on the data to be processed to obtain the hash value, and match in the index structure based on the hash value to obtain the successfully matched hash bucket comprises:

calling the execution engine module to perform hash calculation on the data to be processed by using a plurality of preset hash algorithms respectively to obtain a plurality of hash values; and calling the execution engine module to match the plurality of hash values with identifiers of hash buckets comprised in the index structure to obtain a plurality of successfully matched hash buckets.

9. The data processing method according to claim 7, wherein the calling the execution engine module to perform matching in index slots comprised in the successfully matched hash bucket based on the data to be processed to obtain the matching result comprises:

calling the execution engine module to perform matching in the successfully matched hash bucket based on the data to be processed; or calling the execution engine module to calculate fingerprint digest information corresponding to the data to be processed, and perform matching in the successfully matched hash bucket based on the fingerprint digest information.

10. The data processing method according to claim 6, wherein in response to the data operation request being a data read request, the calling the execution engine module to perform, on the target index slot, the data operation indicated by the data operation type information to obtain the data operation result comprises:

in response to determining that both the data to be processed and target data corresponding to the data to be processed are stored in an inline manner, reading, from the target index slot, the target data indicated by the data to be processed; and in response to determining that the data to be processed is stored in the inline manner and the target data corresponding to the data to be processed is stored in a non-inline manner, or in response to determining that the data to be processed is stored in a non-inline manner, obtaining pointer information from the target index slot, and reading, from a memory of a server indicated by the pointer information, the target data corresponding to the data to be processed.

11. The data processing method according to claim 6, wherein in response to the data operation request being a data delete request, the calling the execution engine module to perform, on the target index slot, the data operation indicated by the data operation type information to obtain the data operation result comprises:

in response to determining that both the data to be processed and target data indicated by the data to be processed are stored in an inline manner, deleting the target index slot; and in response to determining that the data to be processed is stored in the inline manner and the target data indicated by the data to be processed is stored in a non-inline manner, or in response to determining that the data to be processed is stored in a non-inline manner, obtaining pointer information from the target index slot, deleting data in a memory of a server indicated by the pointer information, and releasing the target index slot.

12. The data processing method according to claim 11, wherein the deleting the data in the memory of the server indicated by the pointer information comprises:

controlling, by the execution engine module, a memory management module of the smart network card to release the memory of the server indicated by the pointer information, wherein the memory management module is configured to manage the memory of the server.

13. An electronic device, comprising:

a memory and a processor, wherein the memory is configured to store computer program instructions; and the processor is configured to execute the computer program instructions to cause the electronic device to:

receive, by a network card module in a smart network card, a data operation request sent from a client;

call a request analysis module in the smart network card to parse the data operation request to obtain data to be processed and data operation type information;

input the data to be processed and the data operation type information to an execution engine module in the smart network card;

call the execution engine module in the smart network card to perform, based on the data to be processed, a data operation indicated by the data operation type information to obtain a data operation result, wherein performing the data operation comprises determining, using an index structure stored in a memory of the smart network card, a location at which the data to be processed is to be stored or accessed;

call the request analysis module in the smart network card to encapsulate the data operation result to obtain a response to the data operation request; and send, by the network card module in the smart network card, the response to the data operation request to the client.

14. The electronic device according to claim 13, wherein the processor is configured to execute the computer program instructions to cause the electronic device to: call the request analysis module to update a target field in a data structure corresponding to the data operation request based on the data operation result to obtain the response to the data operation request.

15. The electronic device according to claim 13, wherein the processor is configured to execute the computer program instructions to cause the electronic device to: receive, by the network card module, a plurality of data operation requests that are sent from the client and have a same transaction identifier.

16. The electronic device according to claim 15, wherein the processor is configured to execute the computer program instructions to cause the electronic device to:

call the request analysis module to respectively parse the plurality of data operation requests that have the same transaction identifier to obtain a plurality of data fields and a plurality of identical data operation type information items; and call the request analysis module to splice the plurality of data fields to be processed based on sequence indication information respectively comprised in the plurality of data operation requests to obtain the data to be processed.

17. A non-transitory readable storage medium, comprising: computer program instructions which, when executed by at least one processor of an electronic device, cause the electronic device to:

receive, by a network card module in a smart network card, a data operation request sent from a client;

call a request analysis module in the smart network card to parse the data operation request to obtain data to be processed and data operation type information;

input the data to be processed and the data operation type information to an execution engine module in the smart network card;

call the execution engine module in the smart network card to perform, based on the data to be processed, a data operation indicated by the data operation type information to obtain a data operation result, wherein performing the data operation comprises determining, using an index structure stored in a memory of the smart network card, a location at which the data to be processed is to be stored or accessed;

call the request analysis module in the smart network card to encapsulate the data operation result to obtain a response to the data operation request; and send, by the network card module in the smart network card, the response to the data operation request to the client.

18. The non-transitory readable storage medium according to claim 17, wherein the computer program instructions, when executed by at least one processor of an electronic device, cause the electronic device to:

call the request analysis module to update a target field in a data structure corresponding to the data operation request based on the data operation result to obtain the response to the data operation request.

19. The non-transitory readable storage medium according to claim 17, wherein the computer program instructions, when executed by at least one processor of an electronic device, cause the electronic device to:

receive, by the network card module, a plurality of data operation requests that are sent from the client and have a same transaction identifier.

20. The non-transitory readable storage medium according to claim 19, wherein the computer program instructions, when executed by at least one processor of an electronic device, cause the electronic device to:

call the request analysis module to respectively parse the plurality of data operation requests that have the same transaction identifier to obtain a plurality of data fields and a plurality of identical data operation type information items; and call the request analysis module to splice the plurality of data fields to be processed based on sequence indication information respectively comprised in the plurality of data operation requests to obtain the data to be processed.

* * * * *